US011748694B2

(12) United States Patent
Gillen et al.

(10) Patent No.: US 11,748,694 B2
(45) Date of Patent: *Sep. 5, 2023

(54) SYSTEMS AND METHODS FOR DELIVERY OF AN ITEM

(71) Applicant: United Parcel Service of America, Inc., Atlanta, GA (US)

(72) Inventors: Robert J. Gillen, Alpharetta, GA (US); Roberta Walton Hensley, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,033

(22) Filed: Jul. 3, 2019

(65) Prior Publication Data

US 2019/0392389 A1 Dec. 26, 2019

Related U.S. Application Data

(63) Continuation of application No. 13/839,398, filed on Mar. 15, 2013, now Pat. No. 10,387,824.

(Continued)

(51) Int. Cl.
*G06Q 10/08* (2023.01)
*G06Q 10/0835* (2023.01)
(Continued)

(52) U.S. Cl.
CPC ........ *G06Q 10/08355* (2013.01); *G01S 19/14* (2013.01); *G06Q 10/0833* (2013.01); *G06Q 10/0838* (2013.01); *G06Q 50/01* (2013.01)

(58) Field of Classification Search
CPC ......... G06Q 10/08355; G06Q 10/0833; G06Q 10/0838; G06Q 50/01; G01S 19/14
See application file for complete search history.

(56) References Cited

U.S. PATENT DOCUMENTS 3,721,096 A 3/1973 Deckert, Jr. et al.
3,876,059 A 4/1975 Durst
(Continued)

FOREIGN PATENT DOCUMENTS

CN 1643534 A 7/2005
CN 101203873 A 6/2008
(Continued)

OTHER PUBLICATIONS

Arthur, Charles, "Massive rise in internet shopping at Christmas," The Independent, Foreign Edition, London, UK, Jan. 18, 2003, p. 2.*

(Continued)

*Primary Examiner* — Nathan Erb
(74) *Attorney, Agent, or Firm* — SHOOK, HARDY & BACON L.L.P.

(57) ABSTRACT

Generally, embodiments of the present invention provide systems and methods that can identify the location of a consignee and propose one or more alternative delivery location(s). The proposed delivery location may be based on the current location of the consignee, current address on the package to be delivered, information located in a social network (private or public), "to-be" location as determined by the consignee which would be transmitted to the carrier and/or a predicted consignee location. In other embodiments, the consignee or "carrier" may suggest an alternative fixed location or alternative mobile location. In some embodiments, the consignee may indicate an alternative recipient of the item.

20 Claims, 6 Drawing Sheets

Related U.S. Application Data

(60) Provisional application No. 61/745,253, filed on Dec. 21, 2012.

(51) Int. Cl.
  *G06Q 10/083* (2023.01)
  *G06Q 10/0833* (2023.01)
  *G06Q 50/00* (2012.01)
  *G01S 19/14* (2010.01)

(56) References Cited

U.S. PATENT DOCUMENTS

| | | | |
|---|---|---|---|
| 3,933,031 A | 1/1976 | Uhlarik | |
| 4,111,601 A | 9/1978 | Richard | |
| 4,832,204 A | 5/1989 | Handy et al. | |
| 5,153,842 A | 10/1992 | Dlugos, Sr. et al. | |
| 5,168,444 A | 12/1992 | Cukor et al. | |
| 5,375,240 A | 12/1994 | Grundy | |
| 5,398,277 A | 3/1995 | Martin et al. | |
| 5,400,020 A | 3/1995 | Jones et al. | |
| 5,444,444 A | 8/1995 | Ross | |
| 5,460,110 A | 10/1995 | Eronen et al. | |
| 5,623,260 A | 4/1997 | Jones | |
| 5,648,770 A | 7/1997 | Ross | |
| 5,656,799 A | 8/1997 | Ramsden et al. | |
| 5,657,010 A | 8/1997 | Jones | |
| 5,659,731 A | 8/1997 | Gustafson | |
| 5,668,543 A | 9/1997 | Jones | |
| 5,711,670 A | 1/1998 | Barr | |
| 5,786,748 A | 7/1998 | Nikolic et al. | |
| 5,831,860 A | 11/1998 | Foladare et al. | |
| 5,835,377 A | 11/1998 | Bush | |
| 5,884,272 A | 3/1999 | Walker et al. | |
| 5,971,587 A | 10/1999 | Kato et al. | |
| 6,029,140 A | 2/2000 | Martin et al. | |
| 6,047,264 A | 4/2000 | Fisher et al. | |
| 6,085,170 A | 7/2000 | Tsukuda | |
| 6,208,980 B1 | 3/2001 | Kara | |
| 6,211,781 B1 | 4/2001 | McDonald | |
| 6,220,509 B1 | 4/2001 | Byford | |
| 6,236,972 B1 | 5/2001 | Shkedy | |
| 6,278,936 B1 | 8/2001 | Jones | |
| 6,285,916 B1 | 9/2001 | Kadaba et al. | |
| 6,289,323 B1 | 9/2001 | Gordon et al. | |
| 6,292,709 B1 | 9/2001 | Uhl et al. | |
| 6,304,856 B1 | 10/2001 | Soga et al. | |
| 6,313,760 B1 | 11/2001 | Jones | |
| 6,317,060 B1 | 11/2001 | Jones | |
| 6,323,254 B1 | 11/2001 | Weikard et al. | |
| 6,343,275 B1 | 1/2002 | Wong | |
| 6,344,796 B1 | 2/2002 | Ogilvie et al. | |
| 6,356,196 B1 | 3/2002 | Wong et al. | |
| 6,363,323 B1 | 3/2002 | Jones | |
| 6,411,891 B1 | 6/2002 | Jones | |
| 6,422,506 B1 | 7/2002 | Colby | |
| 6,442,589 B1 | 8/2002 | Takahashi et al. | |
| 6,463,354 B1 | 10/2002 | Pintsov | |
| 6,463,420 B1 | 10/2002 | Guidice et al. | |
| 6,486,801 B1 | 11/2002 | Jones | |
| 6,492,912 B1 | 12/2002 | Jones | |
| 6,510,383 B1 | 1/2003 | Jones | |
| 6,536,659 B1 | 3/2003 | Hauser et al. | |
| 6,539,360 B1 | 3/2003 | Kadaba | |
| 6,606,604 B1 | 8/2003 | Dutta | |
| 6,618,668 B1 | 9/2003 | Laird | |
| 6,634,551 B2 | 10/2003 | Barta et al. | |
| 6,683,542 B1 | 1/2004 | Jones | |
| 6,700,507 B2 | 3/2004 | Jones | |
| 6,701,299 B2 | 3/2004 | Kraisser et al. | |
| 6,714,859 B2 | 3/2004 | Jones | |
| 6,741,927 B2 | 5/2004 | Jones | |
| 6,748,318 B1 | 6/2004 | Jones | |
| 6,748,320 B2 | 6/2004 | Jones | |
| 6,763,299 B2 | 7/2004 | Jones | |
| 6,763,300 B2 | 7/2004 | Jones | |
| 6,765,487 B1 | 7/2004 | Holmes et al. | |
| 6,772,130 B1 | 8/2004 | Karbowski et al. | |
| 6,804,606 B2 | 10/2004 | Jones | |
| 6,845,448 B1 | 1/2005 | Chaganti et al. | |
| 6,859,722 B2 | 2/2005 | Jones | |
| 6,862,612 B1 | 3/2005 | Horn et al. | |
| 6,902,109 B2 | 6/2005 | Barta et al. | |
| 6,904,359 B2 | 6/2005 | Jones | |
| 6,931,314 B2 | 8/2005 | Holland et al. | |
| 6,952,645 B1 | 10/2005 | Jones | |
| 6,967,575 B1 | 11/2005 | Dohrmann et al. | |
| 6,975,998 B1 | 12/2005 | Jones | |
| 6,976,090 B2 | 12/2005 | Ben-Shaul et al. | |
| 6,976,900 B2 | 12/2005 | Bolz | |
| 6,978,929 B2 | 12/2005 | Buie et al. | |
| 6,985,871 B2 | 1/2006 | Simon et al. | |
| 6,994,253 B2 | 2/2006 | Miller et al. | |
| 7,028,895 B2 | 4/2006 | Ashaari | |
| 7,030,781 B2 | 4/2006 | Jones | |
| 7,031,959 B2 | 4/2006 | Garner et al. | |
| 7,039,813 B2 | 5/2006 | Algazi et al. | |
| 7,130,803 B1 | 10/2006 | Couch et al. | |
| 7,152,375 B1 | 12/2006 | Mastro et al. | |
| 7,158,948 B1 | 1/2007 | Rodriguez et al. | |
| 7,177,825 B1 | 2/2007 | Borders et al. | |
| 7,212,829 B1 | 5/2007 | Lau et al. | |
| 7,212,984 B2 | 5/2007 | Wolfe et al. | |
| 7,222,081 B1 | 5/2007 | Sone | |
| 7,225,983 B2 | 6/2007 | Park et al. | |
| 7,233,907 B2 | 6/2007 | Young | |
| 7,248,160 B2 | 7/2007 | Mangan et al. | |
| 7,249,044 B2 | 7/2007 | Kumar et al. | |
| 7,249,087 B2 | 7/2007 | Sharp et al. | |
| 7,257,552 B1 | 8/2007 | Franco | |
| 7,305,404 B2 | 12/2007 | Owens et al. | |
| 7,312,702 B1 | 12/2007 | Willms et al. | |
| 7,331,248 B2 | 2/2008 | Maresca, Jr. et al. | |
| 7,363,126 B1 | 4/2008 | Zhong et al. | |
| 7,376,598 B2 | 5/2008 | Estes et al. | |
| 7,385,499 B2 | 6/2008 | Horton et al. | |
| 7,401,357 B2 | 7/2008 | Hasegawa et al. | |
| 7,422,149 B2 | 9/2008 | Aptekar | |
| 7,479,899 B2 | 1/2009 | Horstemeyer | |
| 7,501,946 B2 | 3/2009 | Lanigan et al. | |
| 7,511,617 B2 | 3/2009 | Burman et al. | |
| 7,528,722 B2 | 5/2009 | Nelson | |
| 7,531,163 B2 | 5/2009 | Samadpour | |
| 7,542,972 B2 | 6/2009 | Owens et al. | |
| 7,574,366 B2 | 8/2009 | Burman et al. | |
| 7,580,845 B2 | 8/2009 | Burman et al. | |
| 7,624,024 B2 | 11/2009 | Levis et al. | |
| 7,647,231 B2 | 1/2010 | Kuebert et al. | |
| 7,657,466 B2 | 2/2010 | Klingenberg et al. | |
| 7,663,502 B2 | 2/2010 | Breed | |
| 7,693,723 B2 | 4/2010 | Wade | |
| 7,711,654 B2 | 5/2010 | Schmidtberg et al. | |
| 7,712,670 B2 | 5/2010 | Sauerwein, Jr. et al. | |
| 7,742,928 B2 | 6/2010 | Reynolds et al. | |
| 7,752,134 B2 | 7/2010 | Spear | |
| 7,765,131 B2 | 7/2010 | Klingenberg et al. | |
| 7,769,778 B2 | 8/2010 | Snapp et al. | |
| 7,831,439 B1 | 11/2010 | Bryar et al. | |
| 7,848,961 B2 | 12/2010 | Estes et al. | |
| 7,853,481 B1 | 12/2010 | Johnson | |
| 7,868,753 B2 | 1/2011 | Jenkins et al. | |
| 7,912,854 B2 | 3/2011 | Owens et al. | |
| 7,925,524 B2 | 4/2011 | Florence | |
| 7,962,422 B1 * | 6/2011 | Melechko | G06Q 10/0833 |
| | | | 705/338 |
| 7,969,306 B2 | 6/2011 | Ebert et al. | |
| 7,984,289 B2 | 7/2011 | Orbke et al. | |
| 7,996,328 B1 | 8/2011 | Lundberg et al. | |
| 8,015,023 B1 | 9/2011 | Lee et al. | |
| 8,027,933 B2 | 9/2011 | Lou et al. | |
| 8,036,993 B2 | 10/2011 | Estes | |
| 8,068,930 B2 | 11/2011 | Perez et al. | |
| 8,103,521 B2 | 1/2012 | Kuebert et al. | |
| 8,103,716 B2 | 1/2012 | Boyce et al. | |

(56) References Cited

U.S. PATENT DOCUMENTS

| | | |
|---|---|---|
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,291,234 B2 | 10/2012 | Snapp et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,386,516 B2 | 2/2013 | Owens et al. |
| 8,429,019 B1 | 4/2013 | Yeatts et al. |
| 8,463,568 B1 | 6/2013 | Wynn |
| 8,489,520 B2 | 7/2013 | Kuebert et al. |
| 8,554,694 B1 | 10/2013 | Ward et al. |
| 8,577,802 B1 | 11/2013 | Nichols et al. |
| 8,645,232 B1 | 2/2014 | Cole et al. |
| 8,731,699 B2 | 5/2014 | Nagy et al. |
| 8,736,633 B2 | 5/2014 | Gurusamy |
| 8,812,374 B1 | 8/2014 | Sriram et al. |
| 9,032,032 B2 | 5/2015 | Mills et al. |
| 10,387,824 B2 * | 8/2019 | Gillen .................... G06Q 50/01 |
| 2001/0042024 A1 | 11/2001 | Rogers |
| 2001/0051885 A1 | 12/2001 | Nardulli et al. |
| 2002/0007299 A1 | 1/2002 | Florence |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0022979 A1 | 2/2002 | Whipp et al. |
| 2002/0032573 A1 | 3/2002 | Williams et al. |
| 2002/0032612 A1 | 3/2002 | Williams et al. |
| 2002/0032623 A1 | 3/2002 | Wheeler et al. |
| 2002/0042808 A1 | 4/2002 | Smith et al. |
| 2002/0046173 A1 | 4/2002 | Kelly |
| 2002/0070882 A1 | 6/2002 | Jones |
| 2002/0073039 A1 | 6/2002 | Ogg et al. |
| 2002/0082770 A1 | 6/2002 | Jones |
| 2002/0087371 A1 | 7/2002 | Abendroth |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0130065 A1 | 9/2002 | Bloom |
| 2002/0143430 A1 | 10/2002 | Sansone et al. |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0178074 A1 | 11/2002 | Bloom |
| 2002/0180582 A1 | 12/2002 | Nielsen |
| 2003/0003936 A1 | 1/2003 | Tighe |
| 2003/0004893 A1 | 1/2003 | Blaesche |
| 2003/0032573 A1 | 2/2003 | Tanner et al. |
| 2003/0036938 A1 | 2/2003 | Dutta et al. |
| 2003/0037009 A1 | 2/2003 | Tobin et al. |
| 2003/0074411 A1 | 4/2003 | Nale |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0182017 A1 | 9/2003 | O'donohue et al. |
| 2003/0193414 A1 | 10/2003 | Jones |
| 2003/0195811 A1 | 10/2003 | Hayes et al. |
| 2003/0200168 A1 | 10/2003 | Cullen et al. |
| 2004/0030478 A1 | 2/2004 | Holland et al. |
| 2004/0073499 A1 | 4/2004 | Martin et al. |
| 2004/0088224 A1 | 5/2004 | Mukai |
| 2004/0093312 A1 | 5/2004 | Cordery et al. |
| 2004/0117326 A1 | 6/2004 | Amato |
| 2004/0117328 A1 | 6/2004 | Andrew |
| 2004/0133446 A1 | 7/2004 | Myrick et al. |
| 2004/0149824 A1 | 8/2004 | Miller et al. |
| 2004/0158351 A1 | 8/2004 | Rivalto |
| 2004/0193438 A1 | 9/2004 | Stashluk et al. |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0220845 A1 | 11/2004 | Malapitan |
| 2004/0221005 A1 | 11/2004 | Albaugh et al. |
| 2004/0227630 A1 | 11/2004 | Shannon et al. |
| 2004/0241644 A1 | 12/2004 | Samadpour |
| 2004/0243430 A1 * | 12/2004 | Horstemeyer .......... H04L 63/08 <br> 340/928 |
| 2004/0243664 A1 | 12/2004 | Horstemeyer |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | Mclellan et al. |
| 2005/0030152 A1 | 2/2005 | Cooper |
| 2005/0038758 A1 | 2/2005 | Hilbush et al. |
| 2005/0043845 A1 | 2/2005 | Wiechers |
| 2005/0071258 A1 | 3/2005 | Kumakawa |
| 2005/0080638 A1 | 4/2005 | Maseruka |
| 2005/0082752 A1 | 4/2005 | Acosta |
| 2005/0104716 A1 | 5/2005 | Simms et al. |
| 2005/0114221 A1 | 5/2005 | Walters et al. |
| 2005/0119786 A1 * | 6/2005 | Kadaba ............ G07B 17/00467 <br> 700/224 |
| 2005/0177387 A1 | 8/2005 | Mojsa |
| 2005/0216144 A1 | 9/2005 | Baldassa |
| 2005/0216294 A1 | 9/2005 | Labow |
| 2005/0216553 A1 | 9/2005 | Mallonee et al. |
| 2005/0251402 A1 | 11/2005 | Olsen et al. |
| 2005/0252596 A1 | 11/2005 | Olsen et al. |
| 2006/0010037 A1 | 1/2006 | Angert et al. |
| 2006/0022895 A1 | 2/2006 | Williams et al. |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0074729 A1 | 4/2006 | Capotosto et al. |
| 2006/0085273 A1 | 4/2006 | Mayer et al. |
| 2006/0097896 A1 | 5/2006 | Jones |
| 2006/0100970 A1 | 5/2006 | Morony et al. |
| 2006/0128023 A1 | 6/2006 | Waterhouse et al. |
| 2006/0149577 A1 | 7/2006 | Stashluk et al. |
| 2006/0225140 A1 | 10/2006 | Mergenthaler |
| 2006/0229895 A1 | 10/2006 | Kodger |
| 2006/0248941 A1 | 11/2006 | Maresca et al. |
| 2006/0255136 A1 | 11/2006 | Wagner et al. |
| 2006/0282277 A1 | 12/2006 | Ng |
| 2007/0000989 A1 | 1/2007 | Kadaba |
| 2007/0005452 A1 | 1/2007 | Klingenberg et al. |
| 2007/0078797 A1 | 4/2007 | Won et al. |
| 2007/0083410 A1 | 4/2007 | Hanna |
| 2007/0133876 A1 | 6/2007 | Chande et al. |
| 2007/0150533 A1 | 6/2007 | Krause et al. |
| 2007/0156415 A1 | 7/2007 | Foth et al. |
| 2007/0156439 A1 | 7/2007 | Fyda et al. |
| 2007/0192191 A1 | 8/2007 | Neal et al. |
| 2007/0200671 A1 | 8/2007 | Kelley et al. |
| 2007/0202802 A1 | 8/2007 | Kallio et al. |
| 2007/0257774 A1 | 11/2007 | Stumpert et al. |
| 2007/0290789 A1 | 12/2007 | Segev et al. |
| 2007/0296545 A1 | 12/2007 | Clare |
| 2008/0004995 A1 | 1/2008 | Klingenberg et al. |
| 2008/0080700 A1 | 4/2008 | Mock et al. |
| 2008/0125959 A1 * | 5/2008 | Doherty .................. H04L 67/18 <br> 701/532 |
| 2008/0133261 A1 | 6/2008 | Ray |
| 2008/0147268 A1 | 6/2008 | Fuller |
| 2008/0154781 A1 | 6/2008 | Kumar |
| 2008/0162241 A1 | 7/2008 | Betancourt |
| 2008/0172305 A1 | 7/2008 | Estes et al. |
| 2008/0201155 A1 | 8/2008 | Som |
| 2008/0208772 A1 | 8/2008 | Rundle |
| 2008/0210749 A1 | 9/2008 | Skaaksrud et al. |
| 2008/0221913 A1 | 9/2008 | Cook et al. |
| 2008/0223940 A1 * | 9/2008 | Lee ........................ G06Q 10/02 <br> 235/494 |
| 2008/0281719 A1 | 11/2008 | Hall et al. |

(56) References Cited

U.S. PATENT DOCUMENTS

| | | |
|---|---|---|
| 2008/0312991 A1 | 12/2008 | Bharadwaj et al. |
| 2008/0319970 A1 | 12/2008 | Garner et al. |
| 2008/0320092 A1 | 12/2008 | Campbell et al. |
| 2009/0012802 A1 | 1/2009 | Pinney |
| 2009/0046892 A1 | 2/2009 | Avant et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164277 A1 | 6/2009 | Bhattacharya |
| 2009/0164295 A1 | 6/2009 | Sion |
| 2009/0164390 A1 | 6/2009 | Calman et al. |
| 2009/0173672 A1 | 7/2009 | Avant et al. |
| 2009/0187489 A1 | 7/2009 | Mallick et al. |
| 2009/0269760 A1 | 10/2009 | Samadpour |
| 2009/0271002 A1 | 10/2009 | Asofsky |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2009/0327361 A1 | 12/2009 | Mills et al. |
| 2010/0004960 A1 | 1/2010 | Frankenberg et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0066513 A1 | 3/2010 | Bauchot et al. |
| 2010/0076903 A1 | 3/2010 | Klingenberg et al. |
| 2010/0100229 A1 | 4/2010 | Whitson et al. |
| 2010/0100233 A1* | 4/2010 | Lu ............. G07B 17/00508 700/226 |
| 2010/0100497 A1 | 4/2010 | Kuebert et al. |
| 2010/0121689 A1 | 5/2010 | Wallace et al. |
| 2010/0185565 A1 | 7/2010 | Wade |
| 2010/0211426 A1 | 8/2010 | Mcclurg |
| 2010/0211444 A1 | 8/2010 | Spear |
| 2010/0228564 A1 | 9/2010 | Kharraz Tavakol et al. |
| 2010/0235210 A1 | 9/2010 | Nadrotowicz, Jr. |
| 2010/0299278 A1 | 11/2010 | Kriss et al. |
| 2010/0332284 A1 | 12/2010 | Hilbush et al. |
| 2011/0004562 A1 | 1/2011 | Hennessy et al. |
| 2011/0022532 A1 | 1/2011 | Kriss |
| 2011/0060552 A1 | 3/2011 | Ono |
| 2011/0074570 A1 | 3/2011 | Feldstein et al. |
| 2011/0119133 A1 | 5/2011 | Igelman et al. |
| 2011/0125665 A1 | 5/2011 | Kadaba |
| 2011/0238195 A1 | 9/2011 | Nagy et al. |
| 2011/0270714 A1 | 11/2011 | Myrick et al. |
| 2011/0320308 A1 | 12/2011 | Dearlove et al. |
| 2012/0016948 A1 | 1/2012 | Sinha |
| 2012/0030133 A1 | 2/2012 | Rademaker |
| 2012/0047085 A1 | 2/2012 | Naghshineh et al. |
| 2012/0089532 A1 | 4/2012 | Kuebert et al. |
| 2012/0095934 A1 | 4/2012 | Klingenberg et al. |
| 2012/0105197 A1 | 5/2012 | Kobres |
| 2012/0130625 A1 | 5/2012 | Srivastava |
| 2012/0130916 A1 | 5/2012 | Neal et al. |
| 2012/0173308 A1 | 7/2012 | Brown et al. |
| 2012/0173448 A1 | 7/2012 | Rademaker |
| 2012/0179622 A1 | 7/2012 | Amato |
| 2012/0208559 A1 | 8/2012 | Svendsen et al. |
| 2012/0220307 A1 | 8/2012 | Wohlert et al. |
| 2012/0235791 A1 | 9/2012 | Donlan et al. |
| 2012/0246077 A1 | 9/2012 | Skaaksrud et al. |
| 2012/0303538 A1 | 11/2012 | Marcus et al. |
| 2012/0303539 A1 | 11/2012 | Marcus et al. |
| 2012/0303540 A1 | 11/2012 | Marcus et al. |
| 2012/0303541 A1 | 11/2012 | Marcus et al. |
| 2012/0303542 A1 | 11/2012 | Marcus et al. |
| 2012/0306618 A1 | 12/2012 | Tieman et al. |
| 2012/0310853 A1 | 12/2012 | Aldstadt |
| 2013/0006731 A1 | 1/2013 | Cook et al. |
| 2013/0006777 A1 | 1/2013 | Krishnareddy et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | Mccullough et al. |
| 2013/0016636 A1 | 1/2013 | Berger et al. |
| 2013/0024525 A1 | 1/2013 | Brady et al. |
| 2013/0054054 A1 | 2/2013 | Tollenaere et al. |
| 2013/0066744 A1 | 3/2013 | Higgins et al. |
| 2013/0073336 A1 | 3/2013 | Heath |
| 2013/0113819 A1 | 5/2013 | Gurusamy |
| 2013/0144428 A1 | 6/2013 | Irwin et al. |
| 2013/0212037 A1 | 8/2013 | Briggman et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262336 A1 | 10/2013 | Wan et al. |
| 2013/0275328 A1 | 10/2013 | Klingenberg et al. |
| 2013/0291079 A1* | 10/2013 | Lowe ............... H04L 65/403 726/7 |
| 2014/0052661 A1 | 2/2014 | Shakes et al. |
| 2014/0180959 A1 | 6/2014 | Gillen et al. |
| 2014/0222711 A1 | 8/2014 | Tibbs et al. |
| 2014/0266668 A1 | 9/2014 | Blankenship et al. |
| 2015/0081587 A1 | 3/2015 | Gillen |
| 2015/0134560 A1 | 5/2015 | Krishnaiahsetty |
| 2015/0154559 A1 | 6/2015 | Barbush et al. |
| 2015/0262125 A1 | 9/2015 | Sager et al. |
| 2018/0061154 A1 | 3/2018 | Scalisi et al. |
| 2020/0027295 A1 | 1/2020 | Bigert et al. |

FOREIGN PATENT DOCUMENTS

| | | | |
|---|---|---|---|
| CN | 102521893 A | 6/2012 | |
| CN | 102567883 A | 7/2012 | |
| DE | 19644163 A1 | 5/1998 | |
| DE | 10007897 C1 | 6/2001 | |
| GB | 2443633 A | 5/2008 | |
| GB | 2483220 A * | 3/2012 | ............. G06Q 50/32 |
| JP | 10-207956 A | 8/1998 | |
| JP | 11-139540 A | 5/1999 | |
| JP | 2000-339373 A | 12/2000 | |
| JP | 2001-14393 A | 1/2001 | |
| JP | 2001-22678 A | 1/2001 | |
| JP | 2002-42008 A | 2/2002 | |
| JP | 2002-56307 A | 2/2002 | |
| JP | 2003-41825 A | 2/2003 | |
| JP | 2004339737 A | 12/2004 | |
| JP | 2005-213020 * | 8/2005 | ............. B65G 61/00 |
| JP | 2005-213020 A | 8/2005 | |
| JP | 2006-206225 A | 8/2006 | |
| TW | 201220221 A1 | 5/2012 | |
| WO | 00/19170 A1 | 4/2000 | |
| WO | 00/19171 A1 | 4/2000 | |
| WO | 00/30014 A1 | 5/2000 | |
| WO | 00/46726 A2 | 8/2000 | |
| WO | 00/46728 A2 | 8/2000 | |
| WO | 00/52422 A1 | 9/2000 | |
| WO | 01/16889 A1 | 3/2001 | |
| WO | 01/29778 A1 | 4/2001 | |
| WO | 01/35344 A2 | 5/2001 | |
| WO | 01/39031 A2 | 5/2001 | |
| WO | 01/65451 A1 | 9/2001 | |
| WO | 01/65454 A2 | 9/2001 | |
| WO | 01/65523 A1 | 9/2001 | |
| WO | 01/65524 A1 | 9/2001 | |
| WO | 01/67344 A1 | 9/2001 | |
| WO | 01/72109 A2 | 10/2001 | |
| WO | 01/84359 A2 | 11/2001 | |
| WO | 01/88831 A2 | 11/2001 | |
| WO | 01/97101 A2 | 12/2001 | |
| WO | 02/07104 A1 | 1/2002 | |
| WO | 02/17045 A2 | 2/2002 | |
| WO | 02/052378 A2 | 7/2002 | |
| WO | 03/034293 A1 | 4/2003 | |
| WO | 2004/015518 A2 | 2/2004 | |
| WO | 2005/105329 A1 | 11/2005 | |
| WO | 2011/017286 A2 | 2/2011 | |
| WO | 2011/150971 A1 | 12/2011 | |
| WO | 2012/045182 A1 | 4/2012 | |
| WO | 2012/129529 A1 | 9/2012 | |
| WO | 2012/135143 A2 | 10/2012 | |
| WO | 2012/161728 A1 | 11/2012 | |

(56) References Cited

FOREIGN PATENT DOCUMENTS

| WO | 2012/161730 A2 | 11/2012 |
| WO | 2012/161731 A2 | 11/2012 |
| WO | 2012/161732 A2 | 11/2012 |

OTHER PUBLICATIONS

Final Office Action received for U.S. Appl. No. 13/326,807, dated Apr. 7, 2015, 14 pages.
Final Office Action received for U.S. Appl. No. 13/326,807, dated Jun. 26, 2014, 10 pages.
Final Office Action received for U.S. Appl. No. 13/326,851, dated Apr. 29, 2015, 15 pages.
Final Office Action received for U.S. Appl. No. 13/326,887, dated Apr. 9, 2015, 15 pages.
Final Office Action received for U.S. Appl. No. 13/465,555, dated Jul. 17, 2015, 12 pages.
Final Office Action received for U.S. Appl. No. 13/465,555, dated Mar. 15, 2017, 9 pages.
Final Office Action received for U.S. Appl. No. 13/465,555, dated Mar. 17, 2016, 16 pages.
Final Office Action received for U.S. Appl. No. 13/465,555, dated Nov. 20, 2014, 9 pages.
Final Office Action received for U.S. Appl. No. 13/569,316, dated Dec. 24, 2013, 10 pages.
Final Office Action received for U.S. Appl. No. 13/569,316, dated Jun. 29, 2017, 40 pages.
Final Office Action received for U.S. Appl. No. 13/569,316, dated Mar. 3, 2015, 13 pages.
Final Office Action received for U.S. Appl. No. 13/569,316, dated May 10, 2013, 11 pages.
Final Office Action received for U.S. Appl. No. 13/569,316, dated Nov. 6, 2012, 12 pages.
Final Office Action received for U.S. Appl. No. 13/569,316, dated Nov. 17, 2015, 19 pages.
Final Office Action received for U.S. Appl. No. 13/746,854, dated Nov. 17, 2015, 15 pages.
Final Office Action received for U.S. Appl. No. 13/746,862, dated Jul. 10, 2017, 38 pages.
Final Office Action received for U.S. Appl. No. 13/746,862, dated Mar. 2, 2015, 14 pages.
Final Office Action received for U.S. Appl. No. 13/746,862, dated Nov. 17, 2015, 16 pages.
Final Office Action received for U.S. Appl. No. 13/762,969, dated Apr. 14, 2015, 12 pages.
Final Office Action received for U.S. Appl. No. 13/913,066, dated Mar. 20, 2015, 13 pages.
Final Office Action received for U.S. Appl. No. 13/913,066, dated May 27, 2016, 20 pages.
Final Office Action received for U.S. Appl. No. 13/913,171, dated Jul. 18, 2017, 23 pages.
Final Office Action received for U.S. Appl. No. 13/913,171, dated Jun. 8, 2016, 19 pages.
Final Office Action received for U.S. Appl. No. 13/913,171, dated Mar. 24, 2015, 12 pages.
Final Office Action received for U.S. Appl. No. 13/913,185, dated May 16, 2014, 16 pages.
Final Office Action received for U.S. Appl. No. 13/913,185, dated Oct. 20, 2015, 18 pages.
Final Office Action received for U.S. Appl. No. 13/913,185, dated Sep. 11, 2017, 19 pages.
Final Office Action received for U.S. Appl. No. 14/640,753, dated Jan. 16, 2018, 21 pages.
Final Office Action received for U.S. Appl. No. 13/913,191,dated Jun. 9, 2016, 19 pages.
Final Office Action received for U.S. Appl. No. 13/913,191, dated Mar. 10, 2015, 14 pages.
Final Office Action received for U.S. Appl. No. 13/913,198, dated Jun. 14, 2016, 20 pages.
Final Office Action received for U.S. Appl. No. 13/913,198, dated Mar. 11, 2015, 13 pages.
Final Office Action Received for U.S. Appl. No. 14/025,893, dated Apr. 7, 2017, 23 pages.
Final Office Action received for U.S. Appl. No. 14/049,605, dated Dec. 12, 2016, 16 pages.
Final Office Action received for U.S. Appl. No. 14/049,605, dated Oct. 2, 2017, 23 pages.
Final Office Action received for U.S. Appl. No. 14/049,828, dated May 3, 2017, 20 pages.
Final Office Action received for U.S. Appl. No. 14/100,556, dated Sep. 20, 2017, 9 pages.
Final Office Action received for U.S. Appl. No. 11/460,268, dated Aug. 6, 2009, 10 pages.
Final Office Action received for U.S. Appl. No. 13/174,248, dated May 16, 2013, 10 pages.
Final Office Action received for U.S. Appl. No. 13/174,269, dated May 8, 2013, 11 pages.
Final Office Action received for U.S. Appl. No. 13/174,290, dated May 15, 2013, 10 pages.
Final Office Action received for U.S. Appl. No. 13/174,299, dated May 15, 2013, 10 pages.
Final Office Action received for U.S. Appl. No. 13/174,306, dated May 21, 2013, 11 pages.
Final Office Action received for U.S. Appl. No. 13/181,185, dated Sep. 26, 2013, 15 pages.
Final Office Action received for U.S. Appl. No. 13/839,398, dated Jan. 20, 2016, 10 pages.
Final Office Action received for U.S. Appl. No. 13/913,198, dated Jul. 28, 2017, 21 pages.
Final Office Action received for U.S. Appl. No. 14/025,893, dated May 23, 2018, 32 pages.
Frontline Solutions, "Fed Ex Improves Internal, External Operations", Article, Fairfax, Virginia and Memphis, Tennessee, Available at: <http://www.frontlinemagazine.com/art_th/04052001.htx>, Apr. 5, 2001, pp. 1-2.
Gao et al., "Cyber-Physical-Social Systems: Harnessing the Crowdsourcing Power of Social Media for Disaster Relief", IEEE Intelligent Systems, IEEE Computer Society, 2011, pp. 10-14.
Harrington, Lisa, "The US Postal Service Gets Serious about Serving Business in the New Economy", Transportation & Distribution, vol. 41, No. 5, Penton Publishing, Inc., United States of America, May 2000, p. 2.
Non-Final Office Action received for U.S. Appl. No. 13/913,066, dated Nov. 26, 2014, 5 pages.
Non-Final Office Action received for U.S. Appl. No. 13/913,066, dated Oct. 11, 2013, 8 pages.
Non-Final Office Action received for U.S. Appl. No. 13/913,066, dated Oct. 24, 2017, 19 pages.
Non-Final Office Action received for U.S. Appl. No. 13/913,171, dated Dec. 15, 2015, 14 pages.
Non-Final Office Action received for U.S. Appl. No. 13/913,171, dated Jan. 27, 2017, 21 pages.
Non-Final Office Action received for U.S. Appl. No. 13/913,171, dated Nov. 20, 2014, 5 pages.
Non-Final Office Action received for U.S. Appl. No. 13/913,171, dated Oct. 2, 2013, 8 pages.
Non-Final Office Action received for U.S. Appl. No. 13/913,185, dated Dec. 13, 2013, 14 pages.
Non-Final Office Action received for U.S. Appl. No. 13/913,185, dated Jan. 30, 2015, 15 pages.
Non-Final Office Action received for U.S. Appl. No. 13/913,185, dated Jun. 15, 2015,16 pages.
Non-Final Office Action received for U.S. Appl. No. 13/913,185, dated Mar. 23, 2017, 25 pages.
Non-Final Office Action received for U.S. Appl. No. 13/913,191, dated Dec. 5, 2014, 5 pages.
Non-Final Office Action received for U.S. Appl. No. 13/913,191, dated Jan. 12, 2017, 20 pages.
Non-Final Office Action received for U.S. Appl. No. 13/913,191, dated Oct. 24, 2013, 9 pages.
Non-Final Office Action received for U.S. Appl. No. 13/913,191, dated Sep. 24, 2015, 14 pages.

(56) References Cited

OTHER PUBLICATIONS

Non-Final Office Action received for U.S. Appl. No. 13/913,198, dated Dec. 1, 2014, 5 pages.
Non-Final Office Action received for U.S. Appl. No. 13/913,198, dated Oct. 25, 2013, 9 pages.
Non-Final Office Action received for U.S. Appl. No. 13/913,198, dated Sep. 24, 2015, 15 pages.
Non-Final Office Action received for U.S. Appl. No. 14/025,893, dated Nov. 22, 2017, 20 pages.
Non-Final Office Action received for U.S. Appl. No. 14/025,893, dated Sep. 22, 2016, 16 pages.
Non-Final Office Action received for U.S. Appl. No. 14/049,605, dated Aug. 25, 2016, 15 pages.
Non-Final Office Action received for U.S. Appl. No. 14/049,605, dated Jun. 14, 2017, 20 pages.
Non-Final Office Action received for U.S. Appl. No. 14/049,828, dated Oct. 3, 2016, 20 pages.
Non-Final Office Action received for U.S. Appl. No. 14/100,556, dated Mar. 25, 2016, 17 pages.
Non-Final Office Action received for U.S. Appl. No. 14/100,556, dated May 1, 2017, 21 pages.
Non-Final Office Action received for U.S. Appl. No. 13/181,185, dated Aug. 4, 2017, 24 pages.
Non-Final Office Action received for U.S. Appl. No. 13/181,185, dated Apr. 13, 2016, 23 pages.
Notice of Allowance received for U.S. Appl. No. 12/616,183, dated Nov. 10, 2011, 7 pages.
Notice of Allowance received for U.S. Appl. No. 11/425,333, dated Nov. 2, 2009, 10 pages.
Notice of Allowance received for U.S. Appl. No. 13/913,198, dated Mar. 6, 2014, 7 pages.
Notice of Allowance received for U.S. Appl. No. 13/913,191, dated Feb. 20, 2014, 7 pages.
Notice of Allowance received for U.S. Appl. No. 13/913,171, dated Feb. 11, 2014, 7 pages.
Notice of Allowance received for U.S. Appl. No. 11/460,268, dated Mar. 25, 2010, 6 pages.
Notice of Allowance received for U.S. Appl. No. 13/326,750, dated Jun. 17, 2014, 7 pages.
Notice of Allowance received for U.S. Appl. No. 13/913,066, dated Feb. 5, 2014, 7 pages.
Office Action received for U.S. Appl. No. 13/746,854, dated Jul. 11, 2017, 36 pages.
Office Action received for U.S. Appl. No. 13/746,854, dated Mar. 9, 2017, 34 pages.
Office Action received for Canadian Patent Application 2,957,135, dated Dec. 27, 2017, 8 pages.
Office Action received for Canadian Patent Application 2,954,156, dated Nov. 22, 2017, 4 pages.
Office Action received for Canadian Patent Application 2,924,132, dated Nov. 20, 2017, 6 pages.
Office Action received for Canadian Patent Application No. 2,942,296, dated Jul. 11, 2017, 6 pages.
Office Action received for Canadian Patent Application No. 2,924,132, dated Feb. 10, 2017, 4 pages.
Office Action received for Canadian Patent Application No. 2,609,841, dated Aug. 26, 2015, 5 pages.
Office Action received for Canadian Patent Application No. 2,609,841, dated Dec. 2, 2011, 4 pages.
Office Action received for Canadian Patent Application No. 2,609,841, dated Nov. 14, 2016, 8 pages.
Office Action received for Canadian Patent Application No. 2,609,841, dated Oct. 6, 2014, 3 pages.
Office Action received for Canadian Patent Application No. 2,881,201, dated Jun. 6, 2017, 6 pages.
Office Action received for Canadian Patent Application No. 2,884,747, dated Apr. 27, 2017, 4 pages.
Office Action received for Canadian Patent Application No. 2,504,285, dated Feb. 15, 2012, 4 pages.
Office Action received for European Patent Application No. 06773704.9, dated Sep. 15, 2017, 5 pages.
Office Action received for Canadian Patent Application No. 2,957,133, dated Dec. 22, 2017, 10 pages.
Office Action received for Canadian Patent Application No. 2,891,876, dated Jun. 15, 2016, 4 pages.
Office Action received for Canadian Patent Application No. 2,885,818, dated May 30, 2016, 4 pages.
Office Action received for Canadian Patent Application No. 2,884,747, dated May 30, 2016, 4 pages.
Office Action received for Canadian Patent Application No. 2,885,818, dated May 24, 2017, 7 pages.
Office Action received for Chinese Patent Application No. 201380070854.0, dated Jun. 29, 2017, 15 pages.
Office Action received for Chinese Patent Application No. 201380070843.2, dated Jun. 27, 2017, 23 pages.
Office Action received for Chinese Patent Application No. 201380067429.6, dated Apr. 27, 2017, 22 pages.
Office Action received for European Patent Application No. 13796181.9, dated Feb. 10, 2017, 5 pages.
Office Action received for European Patent Application No. 13795343.6, dated Mar. 2, 2017, 5 pages.
Office Action received for European Patent Application No. 13158967.3, dated Mar. 23, 2017, 7 pages.
Office Action received for European Patent Application No. 13158966.5, dated Mar. 23, 2017, 6 pages.
Office Action received for European Patent Application No. 13158965.7, dated Mar. 23, 2017, 7 pages.
Office Action received for European Patent Application No. 03778034.3, dated Dec. 2, 2013, 5 pages.
Office Action received for European Patent Application No. 06773704.9, dated Feb. 5, 2014, 6 pages.
Office Action received for European Patent Application No. 13158961.6, dated Mar. 3, 2017, 6 pages.
Office Action received for European Patent Application No. 13158964.0, dated Mar. 23, 2017, 7 pages.
"Outlook 2000 Handbook First Edition", last 9 lines, 2000, p. 95.
Pender, Lee, "Hard Times are the Best Times", Magazine, Cio, Available at: <www.cio.com/archive/081501/besttimes_content.html>, Aug. 15, 2001, pp. 3-7.
"Quantum View Inbound, Quantum View Outbound, How Quantum View Outbound Works, Quantum View Service Options, Quantum View and UPS Administration", QuantumViewTM, Available at: <http://www.ups.com/iovs/ivs_learnmore.html>, Aug. 7, 2002, 15 pages.
Raco Industries, "Increase Delivery Visibility And Simplify Your Process", Available at: <http://www.racointeractive.com/media/834/raco_interactive-pd.pdf>, Retrieved on Sep. 25, 2013, 2 pages.
Requisition by Examiner received for Canadian Patent Application No. 2,504,285, dated Oct. 10, 2013, 2 pages.
Requisition by the Examiner received for Canadian Patent Application No. 2,842,840, dated Nov. 4, 2015, 5 pages.
Summons to Attend Oral Proceedings received for European Patent Application No. 06773704.9, dated Apr. 10, 2017, 12 pages.
Summons to Attend Oral Proceedings received for European Patent Application No. 13795343.6, dated Nov. 17, 2017, 12 pages.
Summons to Attend Oral Proceedings received for European Patent Application No. 13796181.9, dated Oct. 12, 2017, 12 pages.
Van Huzien, Gordon, "Messaging: The Transport Part of The XML Puzzle", IBM Developer Works, Article, Retrieved from: <URL:http://www-106.ibm.com/developerworks/library/xml-messaging/>, Jul. 2000, 8 pages.
Non-Final Office Action received for U.S. Appl. No. 14/707,039, dated Jan. 11, 2019, 18 pages.
Charles, Arthur, "Massive Rise in Internet Shopping at Christmas", The Independent, Foreign Edition: 2, Jan. 18, 2003, 1 page.
Notice of Allowance received for U.S. Appl. No. 13/839,398, dated Apr. 3, 2019, 16 pages.
Henderson, Timothy, "Buy.com Boosts Returns Process Efficiency with New Solution", ProQuest Info & Learning, vol. 82, No. 11, Nov. 2000, pp. 72-76.

(56) References Cited

OTHER PUBLICATIONS

Henderson, Timothy P., "Scheduling Software Helps Webvan Meet 30-Minute Delivery Window, Descartes", Available at: <www.stores.org>, Jul. 2000, 2 pages.
International Preliminary Report on Patentability received for PCT Patent Application No. PCT/US2013/068219, dated Dec. 12, 2014, 7 pages.
International Preliminary Report on Patentability received for PCT Patent Application No. PCT/US2013/068210, dated Jan. 2, 2015, 8 pages.
International Search Report and Written Opinion received for PCT Patent Application No. PCT/US2015/019475, dated Aug. 31, 2015, 14 pages.
International Search Report and Written Opinion received for PCT Patent Application No. PCT/US2014/042959, dated Aug. 4, 2015, 8 pages.
International Search Report and Written Opinion received for PCT Patent Application No. PCT/US2011/059511, dated May 2, 2012, 6 pages.
International Search Report and Written Opinion received for PCT Patent Application No. PCT/US2013/75572, dated Feb. 20, 2015, 14 pages.
International Search Report and Written Opinion received for PCT Patent Application No. PCT/US2003/034746, dated Jul. 5, 2005, 3 pages.
International Search Report and Written Opinion received for PCT Patent Application No. PCT/US2011/059504, dated Apr. 24, 2012, 6 pages.
International Search Report and Written Opinion received for PCT Patent Application No. PCT/US2011/059506, dated Aug. 3, 2012, 9 pages.
International Search Report and Written Opinion received for PCT Patent Application No. PCT/US2011/059508, dated Feb. 4, 2015, 9 pages.
International Search Report and Written Opinion received for PCT Patent Application No. PCT/US2011/059513, dated Apr. 27, 2012, 7 pages.
International Search Report and Written Opinion received for PCT Patent Application No. PCT/US2013/068210, dated May 20, 2014, 8 pages.
International Search Report and Written Opinion received for PCT Patent Application No. PCT/US2013/068219, dated Feb. 21, 2014, 12 pages.
International Search Report and Written Opinion received for PCT Patent Application No. PCT/US2015/016025, dated Apr. 29, 2015, 9 pages.
International Search Report and Written Opinion received for PCT Patent Application No. PCT/US06/24169 dated May 10, 2007, 5 pages.
IPventure, "Schedule Distribution Routes and Timeslots", Available online at: <https://www.ipventure.com/onlineorder/distribution.php>, Retrieved on Apr. 16, 2008, 1 page.
Kihon, Kara Jissen., "Made Business Seikou No Tameno Kanpeki Guide—How To E-Commerce", p. 60.
Lindsay, Bruce R., "Congressional Research Service, Social Media and Disasters: Current Uses, Future Options, and Policy Considerations", CRS Report for Congress, Congressional Research Service., Sep. 6, 2011, 10 pages.
"Many Happy Returns—UPS Unveils Advanced Outline Returns Solution", Business Wire, Sep. 20, 2000.
Non-Final Office Action received for U.S. Appl. No. 12/616,183, dated Sep. 23, 2011, 5 pages.
Non-Final Office Action received for U.S. Appl. No. 11/460,268, dated Jan. 23, 2009, 10 pages.
Non Final Office Action received for U.S. Appl. No. 13/174,248, dated Dec. 23, 2016, 28 pages.
Non Final Office Action received for U.S. Appl. No. 13/174,248, dated Sep. 6, 2013,10 pages. es.
Non Final Office Action received for U.S. Appl. No. 13/174,269, dated Jan. 10, 2017, 26 pag
Non Final Office Action received for U.S. Appl. No. 13/174,269, dated Aug. 29, 2013, 10 pages.
Non Final Office Action received for U.S. Appl. No. 13/174,290, dated Dec. 28, 2016, 27 pages.
Non Final Office Action received for U.S. Appl. No. 13/174,299, dated Aug. 29, 2013, 09 pages.
Non Final Office Action received for U.S. Appl. No. 13/174,299, dated Dec. 23, 2016, 27 pages.
Non Final Office Action received for U.S. Appl. No. 13/174,299, dated Jul. 23, 2015, 12 pages.
Non Final Office Action received for U.S. Appl. No. 13/174,306, dated Aug. 29, 2013, 10 pages.
Non Final Office Action received for U.S. Appl. No. 13/174,306, dated Dec. 23, 2016, 25 pages.
Non Final Office Action received for U.S. Appl. No. 13/746,842, dated Oct. 2, 2013, 12 pages.
Non Final Office Action received for U.S. Appl. No. 13/746,854, dated Aug. 19, 2014, 11 pages.
Non Final Office Action received for U.S. Appl. No. 13/746,842, dated Aug. 19, 2014, 14 pages.
Non Final Office Action received for U.S. Appl. No. 13/174,290, dated Aug. 29, 2013, 11 pages.
Non-Final Office Action received for U.S. Appl. No. 13/174,248, dated Aug. 18, 2014, 12 pages.
Non-Final Office Action received for U.S. Appl. No. 10/696,180, dated Dec. 9, 2009, 14 pages.
Non-Final Office Action received for U.S. Appl. No. 10/696,180, dated Feb. 3, 2009, 18 pages.
Non-Final Office Action received for U.S. Appl. No. 10/696,180, dated Jul. 18, 2013, 25 pages.
Non-Final Office Action received for U.S. Appl. No. 10/696,180, dated Jul. 7, 2011, 24 pages.
Non-Final Office Action received for U.S. Appl. No. 10/696,180, dated Jun. 1, 2016, 23 pages.
Non-Final Office Action received for U.S. Appl. No. 10/696,180, dated Jun. 25, 2015, 26 pages.
Non-Final Office Action received for U.S. Appl. No. 10/696,180, dated May 10, 2010, 15 pages.
Non-Final Office Action received for U.S. Appl. No. 10/696,180, dated Nov. 8, 2017, 28 pages.
Non-Final Office Action received for U.S. Appl. No. 11/425,333, dated Oct. 15, 2008, 9 pages.
Non-Final Office Action received for U.S. Appl. No. 14/640,753, dated Jul. 21, 2017, 21 pages.
Non-Final Office Action received for U.S. Appl. No. 14/623,145, dated Aug. 3, 2017, 20 pages.
Non-Final Office Action received for U.S. Appl. No. 13/913,198, dated Feb. 3, 2017, 24 pages.
Notice of Allowance received for U.S. Appl. No. 14/707,039, dated Nov. 27, 2019, 18 pages.
Office Action received for Canadian Patent Application No. 2,954,156, dated Dec. 10, 2019, 5 pages.
"Vehicle Access, Anti-Theft and Security Intelligence Service", Just-auto, QUBE, Apr. 5, 2012, 45 pages.
Final Office Action received for U.S. Appl. No. 14/707,039, dated Aug. 8, 2019, 25 pages.
Applicant Initiated Interview Summary received for U.S. Appl. No. 13/839,398, dated Aug. 21, 2015, 5 pages.
Applicant Initiated Interview Summary received for U.S. Appl. No. 13/839,398, dated Feb. 22, 2016, 5 pages.
"ASP V16-System Walker List Works Manual", line 5, 3.4 Start up and termination of ListWORKS writer, p. 88.
Brewin, et al., "Follow that Package!", Article, Computer World, Available at: <www.computerworld.com/printthis/2001//0,4814,58696,00.html>, Mar. 19, 2001, pp. 1-5.
Caminiti, et al., "United Parcel Service Introduces Advanced Label Imaging System", Business Wire, Section 1, Nov. 29, 1989, 1 page.
Communication Pursuant to Rules 70(2) and 70a(2) EPC received for European Application No. 13796181.9, dated May 24, 2016, 9 pages.
Declaration of David Ellison Pertaining to UPS and Mailbox etc. pre-filing activities from Mar. 2001- Nov. 1, 2002.

(56) References Cited

OTHER PUBLICATIONS

Demarco, Donna, "E-tail Presents Can be Tougher to Send Back than Order", Journal, Knight-Ridder/Tribune Business News, The Dialog Corporation, US, Dec. 28, 1999.

El Portal Del Transporte, "Fedex Insight Empowers Customers with Enhanced Shipment Visibility and Control", Article, Retrieved from: <http://www.transportando.net/newsabri1_completa.htm>, Apr. 11, 2001, pp. 9-10.

Extended European Search Report received for European Patent Application No. 13795343.6, dated May 19, 2016, 9 pages.

Extended European Search Report received for European Patent Application No. 13821253.5, dated May 17, 2016, 11 pages.

Fedex, "FedEx Mobile Ship", Available at: <http://www.fedex.com/us/mobile/label.html,redirected to http://mobilesolutions.fedex.com/shipping-label.html>, Retrieved on Sep. 25, 2013, 2 pages.

Fedex, "RPS Adds Automated Package Pick-up to Redesigned Web Site", Available at: <www.fedex.com/us/about/ground/pressreleases/pressrelease111198.html?link=4>, Retrieved on Sep. 10, 2003.

Final Office Action received for U.S. Appl. No. 13/174,248, dated Dec. 27, 2013, 09 pages.

Final Office Action received for U.S. Appl. No. 13/174,248, dated Jun. 27, 2017, 33 pages.

Final Office Action received for U.S. Appl. No. 13/174,248, dated Mar. 4, 2015, 12 pages.

Final Office Action received for U.S. Appl. No. 13/174,248, dated Nov. 17, 2015, 16 pages.

Final Office Action received for U.S. Appl. No. 13/174,269, dated Dec. 27, 2013, 09 pages.

Final Office Action received for U.S. Appl. No. 13/174,269, dated Mar. 2, 2015, 12 pages.

Final Office Action received for U.S. Appl. No. 13/174,290, dated Dec. 27, 2013, 09 pages.

Final Office Action received for U.S. Appl. No. 13/174,299, dated Dec. 27, 2013, 08 pages.

Final Office Action received for U.S. Appl. No. 13/174,299, dated Nov. 10, 2015, 13 pages.

Final Office Action received for U.S. Appl. No. 13/174,299, dated Mar. 2, 2015, 12 pages.

Final Office Action received for U.S. Appl. No. 13/174,306, dated Dec. 26, 2013, 09 pages.

Final Office Action received for U.S. Appl. No. 13/174,306, dated Mar. 2, 2015, 12 pages.

Final Office Action received for U.S. Appl. No. 13/174,306, dated Nov. 17, 2015, 15 pages.

Final Office Action received for U.S. Appl. No. 13/746,842, dated Feb. 27, 2015, 14 pages.

Final Office Action received for U.S. Appl. No. 13/746,842, dated Feb. 13, 2014, 12 pages.

Final Office Action received for U.S. Appl. No. 13/746,842, dated Jan. 22, 2016, 17 pages.

Final Office Action received for U.S. Appl. No. 13/746,842, dated Jun. 29, 2017, 32 pages.

Final Office Action received for U.S. Appl. No. 13/746,854, dated Dec. 27, 2013, 12 pages.

Final Office Action received for U.S. Appl. No. 13/746,854, dated Feb. 27, 2015, 12 pages.

Final Office Action received for U.S. Appl. No. 10/696,180, dated Mar. 13, 2014, 25 pages.

Final Office Action received for U.S. Appl. No. 10/696,180, dated Aug. 19, 2009, 15 pages.

Final Office Action received for U.S. Appl. No. 10/696,180, dated Dec. 22, 2016, 29 pages.

Final Office Action received for U.S. Appl. No. 10/696,180, dated Feb. 15, 2011, 25 pages.

Final Office Action received for U.S. Appl. No. 10/696,180, dated Jan. 31, 2012, 25 pages.

Final Office Action received for U.S. Appl. No. 10/696,180, dated Oct. 18, 2010, 16 pages.

Final Office Action received for U.S. Appl. No. 10/696,180, dated Oct. 8, 2015, 23 pages.

Final Office Action received for U.S. Appl. No. 11/425,333, dated Jun. 11, 2009, 13 pages.

Final Office Action received for U.S. Appl. No. 13/174,248, dated Feb. 12, 2013, 10 pages.

Final Office Action received for U.S. Appl. No. 13/174,269, dated Feb. 4, 2013, 11 pages.

Final Office Action received for U.S. Appl. No. 13/174,269, dated Nov. 17, 2015, 15 pages.

Final Office Action received for U.S. Appl. No. 13/174,290, dated Feb. 21, 2013, 11 pages.

Final Office Action received for U.S. Appl. No. 13/174,290, dated Nov. 17, 2015, 14 pages.

Final Office Action received for U.S. Appl. No. 13/174,290, dated Mar. 2, 2015, 11 pages.

Final Office Action received for U.S. Appl. No. 13/174,299, dated Feb. 8, 2013, 9 pages.

Final Office Action received for U.S. Appl. No. 13/174,306, dated Feb. 15, 2013, 11 pages.

Final Office Action received for U.S. Appl. No. 13/181,185, dated Jun. 10, 2015, 22 pages.

Final Office Action received for U.S. Appl. No. 13/326,750, dated Apr. 20, 2015, 13 pages.

Non-Final Office Action received for U.S. Appl. No. 13/174,248, dated Jul. 23, 2015, 13 pages.

Non-Final Office Action received for U.S. Appl. No. 13/174,248, dated Nov. 27, 2012, 11 pages.

Non-Final Office Action received for U.S. Appl. No. 13/174,269, dated Aug. 18, 2014, 11 pages.

Non-Final Office Action received for U.S. Appl. No. 13/174,269, dated Jul. 23, 2015, 13 pages.

Non-Final Office Action received for U.S. Appl. No. 13/174,269, dated Nov. 7, 2012, 11 Pages.

Non-Final Office Action received for U.S. Appl. No. 13/174,290, dated Aug. 18, 2014, 11 pages.

Non-Final Office Action received for U.S. Appl. No. 13/174,290, dated Jul. 23, 2015, 12 pages.

Non-Final Office Action received for U.S. Appl. No. 13/174,290, dated Nov. 28, 2012, 12 Pages.

Non-Final Office Action received for U.S. Appl. No. 13/174,299, dated Aug. 18, 2014, 11 pages.

Non-Final Office Action received for U.S. Appl. No. 13/174,299, dated Dec. 31, 2012, 11 Pages.

Non-Final Office Action received for U.S. Appl. No. 13/174,306, dated Aug. 18, 2014, 12 pages.

Non-Final Office Action received for U.S. Appl. No. 13/326,887, dated Dec. 17, 2015, 17 pages.

Non-Final Office Action received for U.S. Appl. No. 13/174,306, dated Jul. 23, 2015, 13 pages.

Non-Final Office Action received for U.S. Appl. No. 13/181,185, dated Apr. 9, 2013, 13 pages.

Non-Final Office Action received for U.S. Appl. No. 13/181,185, dated Mar. 27, 2014, 14 pages.

Non-Final Office Action received for U.S. Appl. No. 13/181,185, dated Nov. 7, 2014, 17 pages.

Non-Final Office Action received for U.S. Appl. No. 13/326,750, dated Dec. 23, 2015, 16 pages.

Non-Final Office Action received for U.S. Appl. No. 13/326,750, dated Jan. 30, 2014, 7 pages.

Non-Final Office Action received for U.S. Appl. No. 13/326,750, dated Sep. 5, 2014, 5 pages.

Non-Final Office Action received for U.S. Appl. No. 13/326,807, dated Feb. 5, 2014, 8 pages.

Non-Final Office Action received for U.S. Appl. No. 13/326,807, dated Sep. 18, 2014, 5 pages.

Non-Final Office Action received for U.S. Appl. No. 13/326,851, dated Aug. 5, 2014, 11 pages.

Non-Final Office Action received for U.S. Appl. No. 13/326,851, dated Dec. 24, 2015, 18 pages.

Non-Final Office Action received for U.S. Appl. No. 13/326,851, dated Feb. 21, 2014, 8 pages.

Non-Final Office Action received for U.S. Appl. No. 13/326,887, dated Feb. 13, 2014, 8 pages.

(56) References Cited

OTHER PUBLICATIONS

Non-Final Office Action received for U.S. Appl. No. 13/326,887, dated Sep. 25, 2014, 5 pages.
Non-Final Office Action received for U.S. Appl. No. 13/465,555, dated Mar. 12, 2015, 9 pages.
Non-Final Office Action received for U.S. Appl. No. 13/465,555, dated Nov. 10, 2016, 16 pages.
Non-Final Office Action received for U.S. Appl. No. 13/465,555, dated Nov. 19, 2015, 14 pages.
Non-Final Office Action received for U.S. Appl. No. 13/465,555, dated Oct. 7, 2014, 10 pages.
Non-Final Office Action received for U.S. Appl. No. 13/569,316, dated Aug. 22, 2014, 11 pages.
Non-Final Office Action received for U.S. Appl. No. 13/569,316, dated Aug. 29, 2013, 11 pages.
Non-Final Office Action received for U.S. Appl. No. 13/569,316, dated Dec. 22, 2016, 27 pages.
Non-Final Office Action received for U.S. Appl. No. 13/569,316, dated Feb. 6, 2013, 10 pages.
Non-Final Office Action received for U.S. Appl. No. 13/569,316, dated Jul. 23, 2015, 14 pages.
Non-Final Office Action received for U.S. Appl. No. 13/569,316, dated Sep. 19, 2012, 11 pages.
Non-Final Office Action received for U.S. Appl. No. 13/746,842, dated Jan. 11, 2017, 30 pages.
Non-Final Office Action received for U.S. Appl. No. 13/746,842, dated Jul. 23, 2015, 15 pages.
Non-Final Office Action received for U.S. Appl. No. 13/746,854, dated Jul. 23, 2015, 14 pages.
Non-Final Office Action received for U.S. Appl. No. 13/746,862, dated Aug. 20, 2014, 12 pages.
Non-Final Office Action received for U.S. Appl. No. 13/746,862, dated Dec. 23, 2013, 13 pages.
Non-Final Office Action received for U.S. Appl. No. 13/746,862, dated Feb. 27, 2017, 32 pages.
Non-Final Office Action received for U.S. Appl. No. 13/746,862, dated Jul. 23, 2015, 14 pages.
Non-Final Office Action received for U.S. Appl. No. 13/746,862, dated Oct. 8, 2013, 16 pages.
Non-Final Office Action received for U.S. Appl. No. 13/762,969, dated Aug. 29, 2014, 9 pages.
Non-Final Office Action received for U.S. Appl. No. 13/839,398, dated Jul. 3, 2018, 7 pages.
Non-Final Office Action received for U.S. Appl. No. 13/839,398, dated Jul. 7, 2015, 8 pages.
Non-Final Office Action received for U.S. Appl. No. 13/839,398, dated Oct. 6, 2016, 20 pages.
Non-Final Office Action received for U.S. Appl. No. 13/913,066, dated Dec. 22, 2016, 11 pages.
Non-Final Office Action received for U.S. Appl. No. 13/913,066, dated Nov. 13, 2015, 15 pages.
Pre-interview First Office Action received for U.S. Appl. No. 16/058,682, dated Nov. 13, 2020, 13 pages.
Office Action received for Canadian Patent Application No. 3,028,412, dated Mar. 31, 2021, 4 pages.
Notice of Allowance received for U.S. Appl. No. 16/058,682, dated Jun. 9, 2021, 15 pages.
Antony et al., "Code Secures Online Sales Deliveries", Computer Weekly, Reed Business Information Ltd, 4, Apr. 19, 2001, 2 pages.
Pre interview First Office Action received for U.S. Appl. No. 16/818,605, dated Sep. 2, 2022, 20 pages.
Office Action received for Canadian Patent Application No. 2,954,156, dated Nov. 9, 2021, 5 pages.
Office Action received for Canadian Patent Application No. 2,954,156, dated Nov. 9, 2022, 7 pages.
Non-Final Office Action received for U.S. Appl. No. 17/471,819, dated Mar. 23, 2023, 14 pages.

\* cited by examiner

SYSTEMS AND METHODS FOR DELIVERY OF AN ITEM

CROSS-REFERENCE TO RELATED APPLICATIONS

This application is a continuation of U.S. patent application Ser. No. 13/839,398 filed Mar. 15, 2013, which claims priority to U.S. Patent Application No. 61/745,253 filed Dec. 21, 2012, all of which are incorporated herein in their entireties by reference.

BACKGROUND OF THE INVENTION

Traditionally, when a package is shipped, the package includes a shipping label that indicates both the consignee's name and the delivery address. The delivery address is a static physical location. However, the person identified as the consignee may not be at the delivery address during the time window when a package is scheduled to be delivered. In which case, a carrier may have to make multiple trips to the address to complete the delivery. This represents an inefficient use of carrier resources.

In other instances, a consignee may cancel other activities to ensure his or her presence at a delivery address to receive a scheduled package delivery due to the importance of the package. As a result, the consignee's movement is constrained due to the impending delivery of a package. Accordingly, a need exists for improved delivery options and methods that can accommodate consignee location changes.

BRIEF SUMMARY OF THE INVENTION

In general, embodiments of the present invention provide systems, methods, apparatus, and computer program products for identifying the location of a consignee and proposing one or more alternative delivery locations.

In accordance with one aspect, a method for identifying an alternative delivery location for item bound for a customer is provided. The method includes the steps of: creating a customer profile, via a computer system, associating a customer with at least one of a mobile device, a social network, or a vehicle device; receiving location information relating to a geographic location from the at least one of a mobile device, a social network, or a vehicle device; capturing shipping indicia from an item and associating the item with the customer profile based at least in part on the shipping indicia; determining one or more alternative delivery locations based at least in part on the received location information; and allowing the customer to select one of the one or more alternative delivery locations for delivery of the item.

In accordance with another aspect, a method for predicting the location of a customer and proposing an alternative delivery location for an item is provided. The method includes the steps of: storing historical location information for the customer; receiving a projected delivery date and delivery location for delivery of an item to the customer; accessing customer calendar information associated with a customer; assigning a first probability value to a first location based at least in part on the calendar information; comparing the delivery location to the stored historical location information; when a match is identified between the delivery location and the stored historical location information, assign a second probability value to the match location, and sending a message to the customer listing the first location or the match location as alternative delivery locations.

In accordance with another aspect, an apparatus including at least one processor and at least one memory including computer program code is provided. The at least one memory and the computer program code is configured to, with the processor, cause the apparatus to at least: create a customer profile associating a customer with at least one of a mobile device, a social network, or a vehicle device; receive location information relating to a geographic location from the at least one of a mobile device, a social network, or a vehicle device; capture shipping indicia from an item and associating the item with the customer profile based at least in part on the shipping indicia; determine one or more alternative delivery locations based at least in part on the received location information; and allow the customer to select one of the one or more alternative delivery locations for delivery of the item.

In accordance with another aspect, an apparatus comprising at least one processor and at least one memory including computer program code, the at least one memory and the computer program code configured to, with the processor, cause the apparatus to at least: store historical location information for the customer; receiving a projected delivery date and delivery location for delivery of an item to the customer; access customer calendar information associated with a customer; assign a first probability value to a first location based at least in part on the calendar information; compare the delivery location to the stored historical location information; when a match is identified between the delivery location and the stored historical location information, assign a second probability value to the match location; and send a message to the customer listing the first location or the match location as alternative delivery locations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
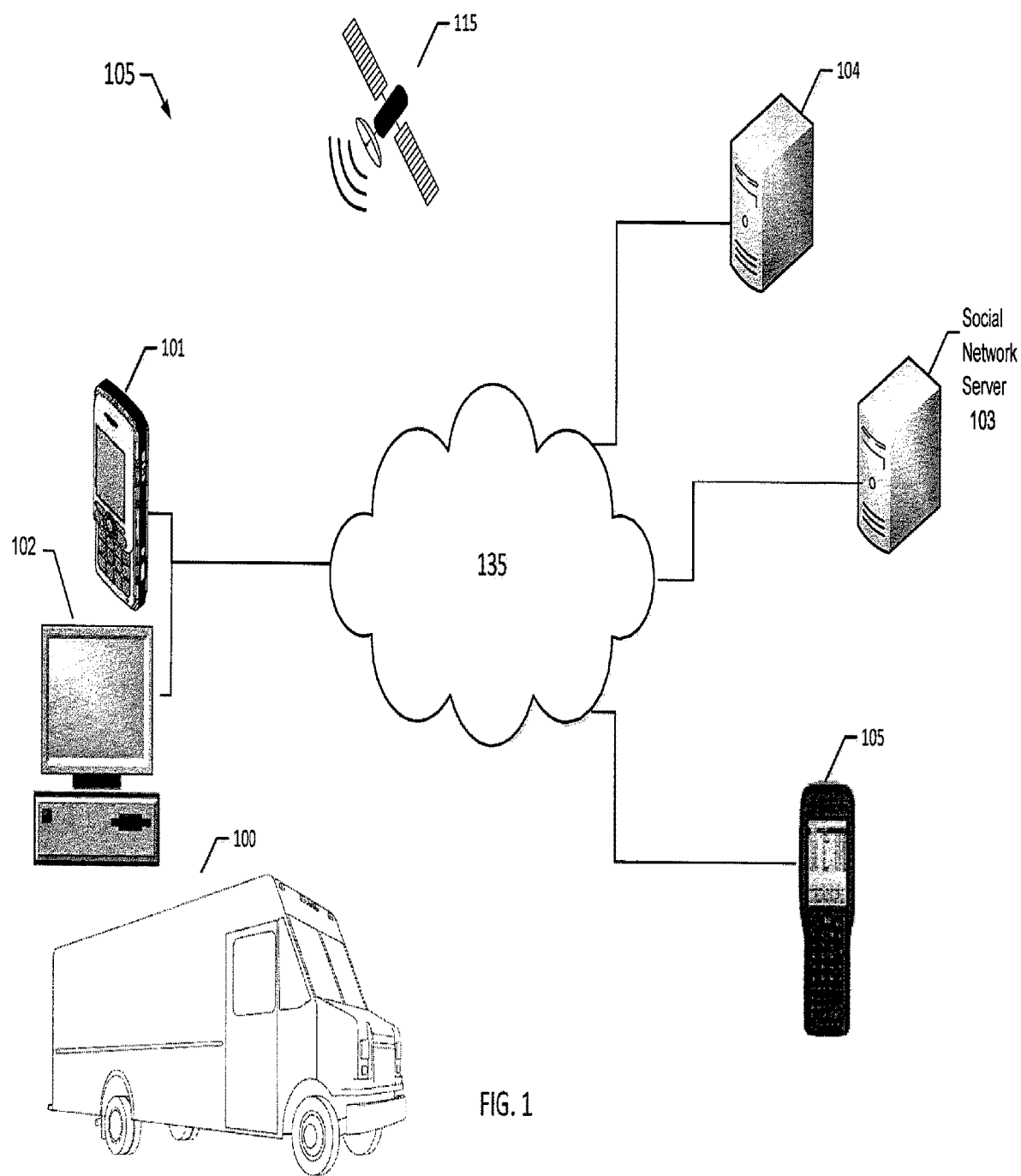
FIG. 1 is a block diagram of system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Generally, embodiments of the present invention provide systems and methods that can identify the location of a consignee and propose one or more alternative delivery location(s). The proposed delivery location may be based on the current location of the consignee, current address on the package to be delivered, information located in a social network (private or public), "to-be" location as determined by the consignee which would be transmitted to the carrier and/or a predicted consignee location. In other embodiments, the consignee or "carrier" may suggest an alternative location that may be a fixed location (e.g., an address, a retail location, a landmark, etc.) or a mobile location (e.g., dynamic location). This alternative location information may allow carriers to leverage internal package system information with current physical location information and potential physical locations to determine through internal network algorithms whether to stage, hold and/or re-distribute packages as required to meet customer needs. In some cases, particular customers who are mobile may not be required to stay in a fixed location to receive a delivery. The collected information may also facilitate increased delivery package density to a single location (mobile or fixed). In various embodiments, the same techniques for identifying alternative delivery locations may be used to identify alternative pickup locations as well.

In some embodiments, a method for delivering a shipment is provided. For example, a customer may register with a delivery service and elect a "Mobile Delivery" program. As part of the registration process, the system may allow the customer to register their mobile device, their physical location (i.e. social check-in service) and/or register their vehicle's location determining device (e.g., navigation device, other GPS enabled device). Also, the system may provide a list of social network options from which the user may select (e.g., Facebook, FourSquare, Yammer, Socialcast, etc.) and these social network accounts would be linked to the customer's account with the system (e.g., the system is a "friend" or otherwise linked). As will be described in more detail below, the system may use location information derived from the customer's mobile device and/or social networking accounts (e.g., public, business, private, vehicle, etc.) to facilitate delivery of a package.

When a package is bound for a Mobile Delivery customer, various embodiments may determine the location of the customer using the customer's mobile device GPS (global positioning system), a vehicle's positioning device (e.g., navigation system), social networks, prediction algorithms or a check-in service with the system. After determining the location of the customer, the system may send a message to the customer indicating the pending delivery and the original delivery location. The message may also provide one or more suggested alternative delivery location(s) and/or may allow the customer to suggest an alternative delivery location. In some embodiments, there may not be an original delivery address but instead the package may simply provide a unique identifier for the customer. In this case, the system would sent suggested delivery locations based on the location information derived from the customer's mobile device GPS (global positioning system), a vehicle's positioning device (e.g., navigation system), social networks, prediction algorithms or a check-in service with the system.

After the delivery location (e.g., original or alternative) is confirmed with the customer, the system may send a unique and secure identification code (e.g., a "Mobile Maxicode") to the customer's mobile device for use at the time of delivery. The system may provide a carrier service provider with en-route delivery instructions based on the customer mobile device GPS and operational telematics from the delivery vehicle. The operational telematics may include the GPS location of the delivery vehicle along with dispatch information. Using this information, the dispatch plan for the carrier service provider may be altered to the new delivery location. U.S. Pat. No. 7,624,024, which is incorporated herein in its entirety by reference, provides a description of a system for updating a dispatch plan while a carrier service provider is en-route that may be used with various embodiments. In various embodiments, the driver will proceed to the delivery location, and locate the consignee. Once the consignee is located, the carrier service provider may verify the secure identification code previously sent to the customer's mobile device by scanning the identification code on the consignee's mobile device. In further embodiments, a delivery may be made to an unattended vehicle and/or pickup from an unattended vehicle as will be described in more detail below I. Methods, Apparatus, Systems, and Computer Program Products As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system architecture that can be used in conjunction with various embodiments of the present invention. As shown in FIG. 1, the system architecture may include one or more mobile devices 101. For instance, the mobile devices 101 may be smartphone devices, mobile telephones, mobile computers, portable digital assistants (PDAs), laptop computers, gaming devices, electronic tablets, navigation systems, GPS tracking device and other types of similar electronic devices. Other mobile devices may include computers and/or GPS devices embedded in vehicles, jewelry, eyewear, watches or other items. In addition, in various embodiments, the mobile devices 101 may include digital imaging capabilities. For example, the mobile devices 101 may comprise a camera, barcode scanner, optical scanner, and/or the like.

The system 10 of FIG. 1 may further comprise one or more delivery vehicles 100, one or more customer computing devices 102, one or more carrier servers 104, one or more carrier devices 105, one or more Global Positioning System (GPS) satellites 115, one or more networks 135, one or more social network servers 103 and/or the like. Each of the components of the system 10 may be in electronic communication with (directly or indirectly), for example, one another over the same or different wireless or wired networks including, for example, a wired or wireless Personal Area Network (PAN), Local Area Network (LAN), Metropolitan Area Network (MAN), Wide Area Network (WAN), cellular network, or the like.

Various embodiments may use other networks to identify customer locations such as RFID and NFC sites. For example, customers may interact with a poster with an installed NFC chip. When accessed with a mobile device, the mobile device may receive a coupon for the item displayed on the poster or be linked to the store/restaurant to place an order. At the same time, the location of the mobile device may be captured. These retailer/restaurant networks may be leveraged for delivery spots.

For RFID embodiments, the customer could carry an RFID tag that stores a unique personal identification number. Various retail stores, malls, hospitals, office buildings, etc. may have RFID readers distributed throughout the associated location that could interrogate the RFID tags and provide a location for the customer base on the read location. Video networks are another way to track locations especially when combined with other tracking methods listed in the document. The captured location information could be communicated to a carrier server to facilitate delivery of an item.

It should be noted that other system architectures are contemplated that may be used to practice various aspects of the invention. Thus, the system architecture provided in FIG. 1 is for illustrative purposes only and should not be construed to limit the scope of the invention. Further, while FIG. 1 illustrates certain system entities as separate, standalone entities, the various embodiments are not limited to this particular architecture.

a. Exemplary Mobile Device

Figure 2:
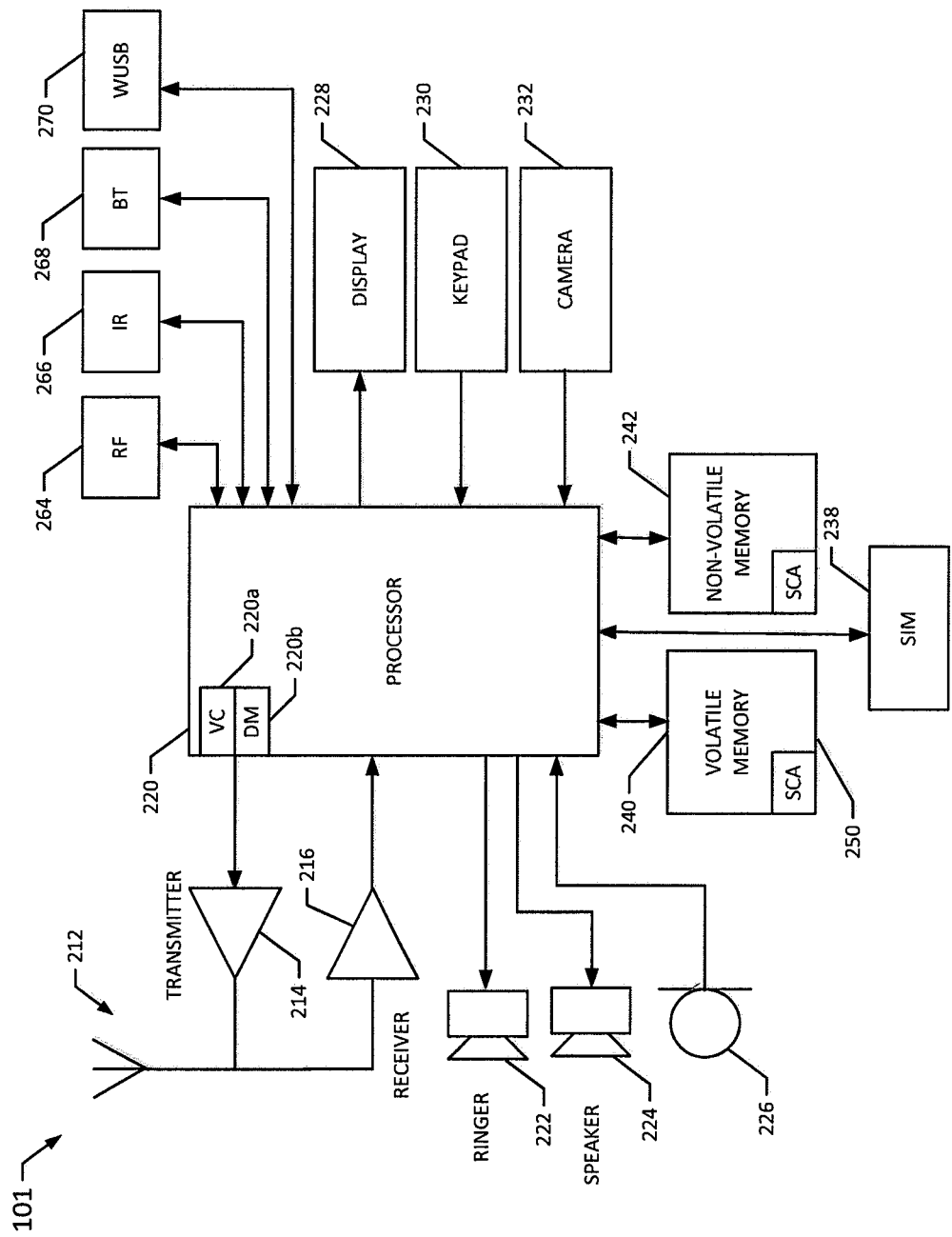
FIG. 2 is a schematic of a mobile device in accordance with certain embodiments of the present invention.

FIG. 2 provides a schematic diagram of a mobile device 101 according to one embodiment of the present invention. In this particular instance, the mobile device 101 is a smartphone. However, it should be understood that the mobile device 101 illustrated and hereinafter described is merely illustrative of one type of device that may implement and/or benefit from various embodiments and, therefore, should not be taken to limit the scope of the invention. Thus, it should be noted that other types of electronic devices, such as mobile telephones, mobile computers, portable digital assistants (PDAs), laptop computers, gaming devices, electronic tablets, and other types of similar electronic devices, may employ various embodiments of the invention.

As shown, the mobile device 101 may include an antenna 212 (or multiple antennas 212) in communication with a transmitter 214 and a receiver 216. The mobile device 101 may also include a processor 220 (e.g., application processor and/or graphics processor) configured to provide signals to and receive signals from the transmitter 214 and receiver 216, respectively.

The processor 220 may, for example, be embodied as various configurations including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 220 comprises a plurality of processors.

The signals sent and received by the processor 220 may include signaling information in accordance with an air interface standard of an applicable cellular system, and/or any number of different wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like.

In this regard, the mobile device 101 may be capable of operating with one or more air interface standards, communication protocols, modulation types, access types, and/or the like. More particularly, the mobile device 101 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile device 101 may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile device 101 may be capable of operating in accordance with 2.5G wireless communication protocols General Packet Radio Service (GPRS), Enhanced Data GSM Environment (EDGE), and/or the like. Further, for example, the mobile device 101 may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile device 101 may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile device 101 may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile devices 101 may also benefit from embodiments of this invention, as should dual or higher mode phones (for example, digital/analog or TDMA/CDMA/analog phones). Additionally, the mobile device 101 may be capable of operating according to Wi-Fi or Worldwide Interoperability for Microwave Access (WiMAX) protocols.

It is understood that the processor 220 may comprise circuitry for implementing audio/video and logic functions of the mobile device 101. For example, the processor 220 may comprise a digital signal processor device, a microprocessor device, an analog-to-digital converter, a digital-to-analog converter, and/or the like. Control and signal processing functions of the mobile device 101 may be allocated between these devices according to their respective capabilities. Additionally, the processor 220 may comprise an internal voice coder (VC) 220a, an internal data modem (DM) 220b, and/or the like. Further, the processor 220 may comprise functionality to operate one or more software programs, which may be stored in memory. For example, the processor 220 may be capable of operating a connectivity program, such as a web browser. The connectivity program may allow the mobile device 101 to transmit and receive web content, such as location-based content, according to a protocol, such as Wireless Application Protocol (WAP), hypertext transfer protocol (HTTP), and/or the like. The mobile device 101 may be capable of using a Transmission Control Protocol/Internet Protocol (TCP/IP) to transmit and receive web content across the internet or other networks.

The mobile device 101 may also comprise a user interface including, for example, an earphone or speaker 224, a ringer 222, a microphone 226, a display 228, a camera 232, a user input interface, and/or the like, which may be operationally coupled to the processor 220. In this regard, the processor 220 may comprise user interface circuitry configured to control at least some functions of one or more elements of the user interface, such as, for example, the speaker 224, the ringer 222, the microphone 226, the display 228, the camera 232, and/or the like. The processor 220 and/or user interface circuitry comprising the processor 220 may be configured to control one or more functions of one or more elements of the user interface through computer program instructions (for example, software and/or firmware) stored on memory accessible to the processor 220 (for example, volatile memory 240, non-volatile memory 242, and/or the like). Although not shown, the mobile device 101 may comprise a battery for powering various circuits related to the mobile device 101, for example, a circuit to provide mechanical vibration as a detectable output. The user input interface may comprise devices allowing the mobile device 101 to receive data, such as a keypad 230, a touch display (not shown), a joystick (not shown), and/or other input device. In embodiments including a keypad, the keypad may comprise numeric (0-9) and related keys (#, *), and/or other keys for operating the mobile device 101.

As shown in FIG. 2, the mobile device 101 may also include one or more components for sharing and/or obtaining data. For example, the mobile device 101 may comprise a short-range radio frequency (RF) transceiver and/or interrogator 264 so data may be shared with and/or obtained from electronic devices in accordance with RF techniques. The mobile device 101 may comprise other short-range transceivers, such as, for example, an infrared (IR) transceiver 266, a Bluetooth™ (BT) transceiver 268 operating using Bluetooth™ brand wireless technology developed by the Bluetooth™ Special Interest Group, a wireless universal serial bus (USB) transceiver 270 and/or the like. The Bluetooth™ transceiver 268 may be capable of operating according to low power or ultra-low power Bluetooth™ technology (for example, Wibree™) radio standards. In this regard, the mobile device 101 and, in particular, the short-range transceiver may be capable of transmitting data to and/or receiving data from electronic devices within a proximity of the mobile device 101, such as within 10 meters, for example. Although not shown, the mobile device 101 may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile device 101 may comprise memory, such as a subscriber identity module (SIM) 238, a removable user identity module (R-UIM), and/or the like, which may store information elements related to a mobile subscriber. In addition to the SIM 238, the mobile device 101 may comprise other removable and/or fixed memory. The mobile device 101 may include volatile memory 240 and/or non-volatile memory 242. For example, volatile memory 240 may include Random Access Memory (RAM) including dynamic and/or static RAM, on-chip or off-chip cache memory, and/or the like. Non-volatile memory 242, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 240, non-volatile memory 242 may include a cache area for temporary storage of data. The memories may store one or more applications (e.g., software programs), instructions, pieces of information, data, and/or the like which may be used by the mobile device 101 for performing functions of the mobile device 101. For instance, as described in greater detail below, one or more of the memories on the device 101 may store a smart code application 250 in various embodiments that performs various aspects of the claimed invention.

b. Exemplary Carrier Server

Figure 3:
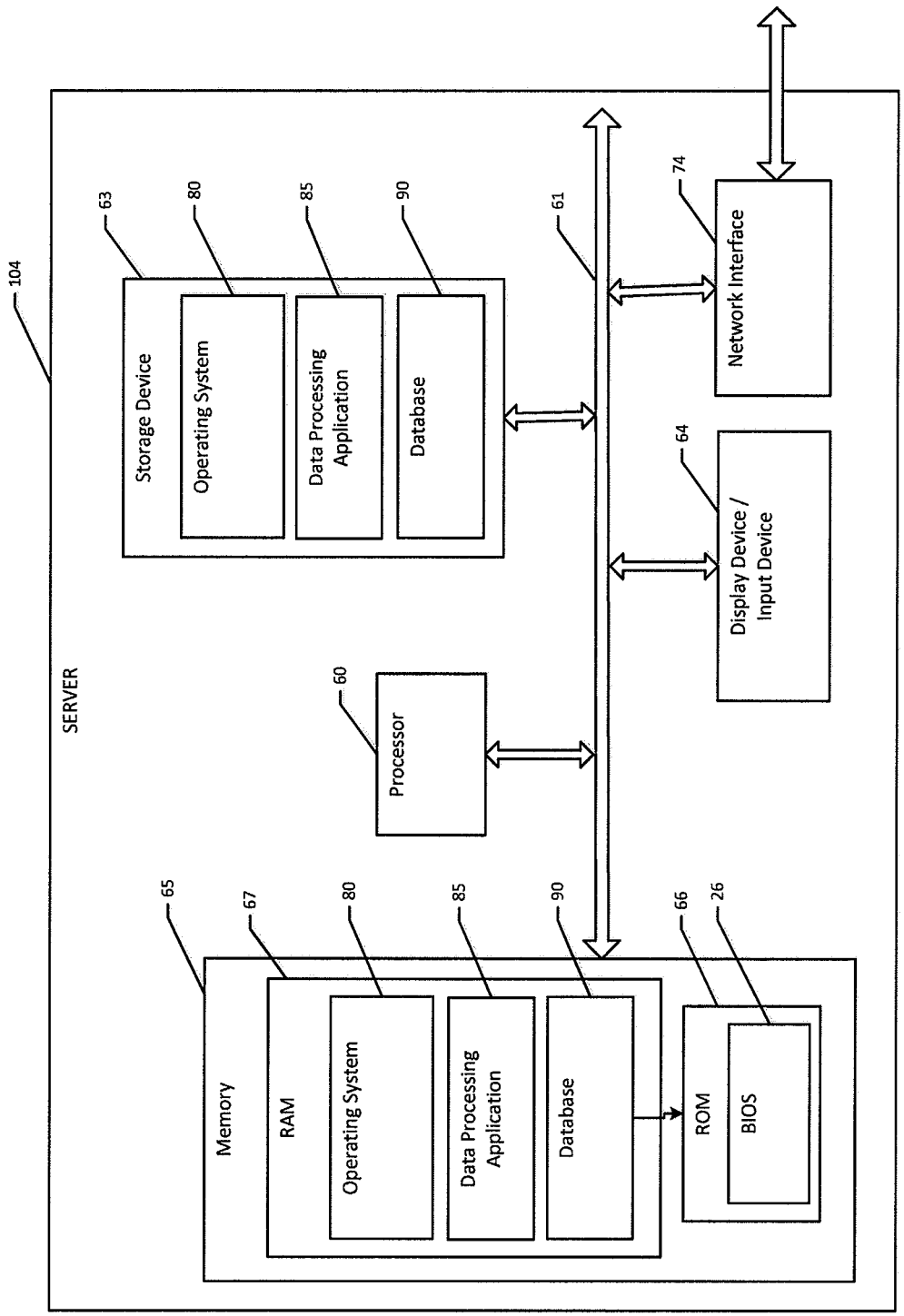
FIG. 3 is a schematic of a one or more carrier servers in accordance with certain embodiments of the present invention.

FIG. 3 provides a schematic of a carrier server 104 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the carrier server 104 may include a processor 60 that communicates with other elements within the carrier server 104 via a system interface or bus 61. The processor 60 may be embodied in a number of different ways. For example, the processor 60 may be embodied as one or more processing elements, one or more microprocessors with accompanying digital signal processors, one or more processors without accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying data may also be included in or associated with the carrier server 104. The display device/input device 64 may be, for example, a keyboard or pointing device that is used in combination with a monitor. The carrier server 104 may further include transitory and non-transitory memory 65, which may include both random access memory (RAM) 67 and read only memory (ROM) 66. The carrier server's ROM 66 may be used to store a basic input/output system (BIOS) 26 containing the basic routines that help to transfer information to the different elements within the carrier server 104.

In addition, in one embodiment, the carrier server 104 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of executable instructions, applications, scripts, program modules, and/or the like may be stored by the various storage devices 63 and/or within RAM 67. Such executable instructions, applications, scripts, program modules, and/or the like may include an operating system 80 and a data processing application 85. As discussed in greater detail below, this application 85 may control certain aspects of the operation of the carrier server 104 with the assistance of the processor 60 and operating system 80, although its functionality need not be modularized. In addition to the program modules, the carrier server 104 may store and/or be in communication with one or more databases, such as database 90.

Also located within and/or associated with the carrier server 104, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the carrier server 104 may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, NAMPS, TACS and/or any other wireless protocol.

It will be appreciated that one or more of the carrier server's 104 components may be located remotely from other carrier server 104 components. Furthermore, one or more of the components may be combined and additional components performing functions described herein may be included in the carrier server 104.

c. Exemplary Carrier Device

Figure 4:
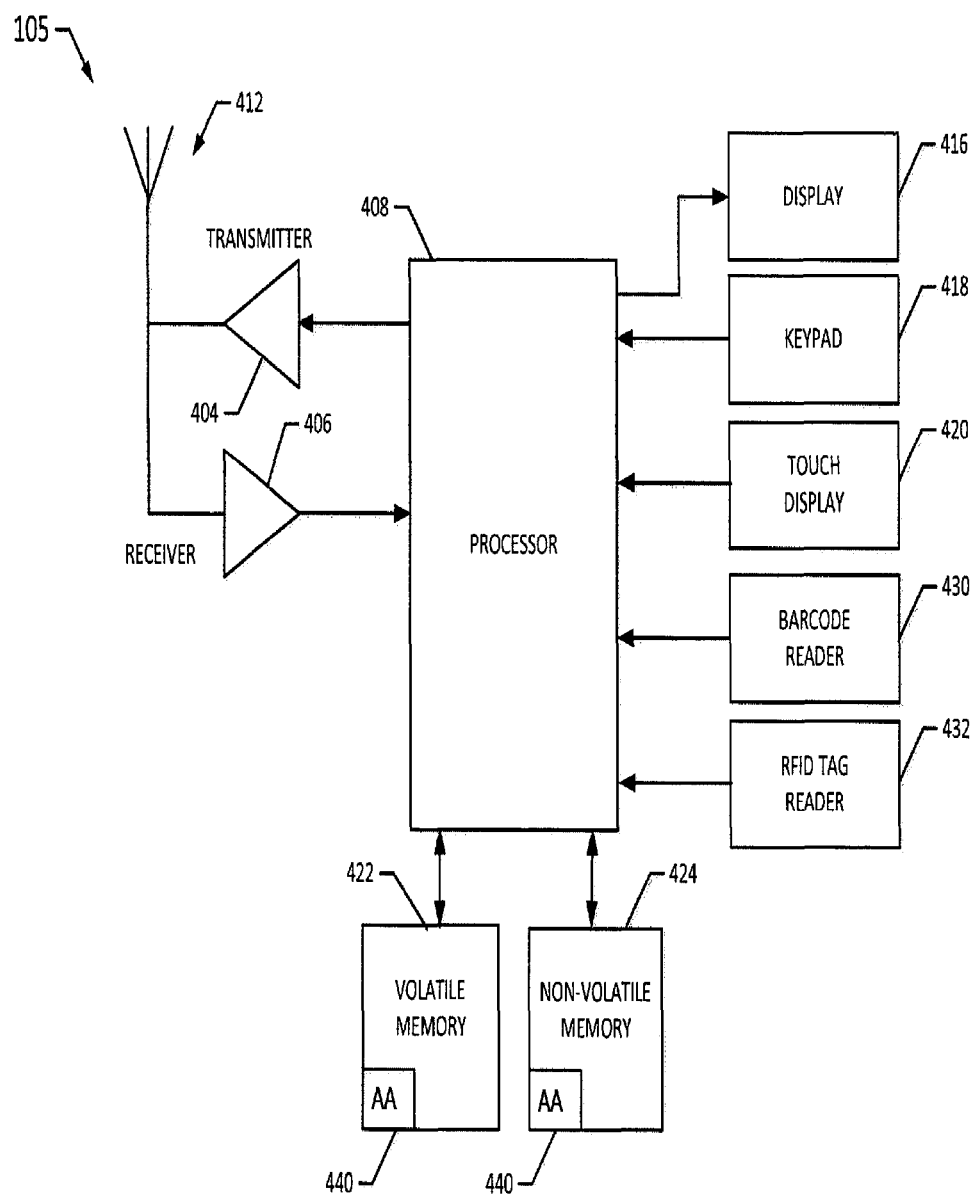
FIG. 4 is a schematic of a carrier device in accordance with certain embodiments of the present invention.

With respect to the carrier device 105, FIG. 4 provides an illustrative schematic representative of a carrier device 105 that can be used in conjunction with the embodiments of the present invention (e.g., a carrier device 105 carried by an operator of a delivery vehicle 100). In some embodiments, a carrier device 105 may be configured to comprise any or all of the hardware and provide some or all of the functionality described above with regard to the example mobile device 101 of FIG. 2. As shown in FIG. 4, the carrier device 105 may comprise an antenna 412, a transmitter 404, a receiver 406, and a processing device 408, e.g., a processor, controller, and/or the like, that provides signals to and receives signals from the transmitter 404 and receiver 406, respectively.

The signals provided to and received from the transmitter 404 and the receiver 406, respectively, may include signaling information in accordance with an air interface standard of applicable wireless (or wired) systems. In this regard, the carrier device 105 may be capable of operating with one or more air interface standards, communication protocols, modulation types, and access types. More particularly, the carrier device 105 may operate in accordance with any of a number of second-generation (2G) communication protocols, third-generation (3G) communication protocols, fourth generation communication protocols (4G), near field communication protocols (NFC) and/or the like. Further, for example, the carrier device 105 may operate in accordance with any of a number of different wireless networking techniques, such as GPRS, GSM, EDGE, UMTS, CDMA2000, WCDMA, TD-SCDMA, LTE, E-UTRAN, Wi-Fi, WiMAX, UWB, NAMPS, TACS, and/or any other wireless protocol. Via these communication standards and protocols, the carrier device 105 can communicate with the carrier server 104 and/or various other entities.

The carrier device 105 may also comprise a user interface (that can include a display 416 coupled to a processing device 408) and/or a user input interface (coupled to the processing device 408). The user input interface can comprise any of a number of devices allowing the carrier device 105 to receive data, such as a keypad 418, a touch display 420, barcode reader 430, RFID tag reader 432, and/or other input device. In embodiments including a keypad 418, the keypad 418 can include the conventional numeric (0-9) and related keys (#, *), and other keys used for operating the carrier device 105 and may include a full set of alphabetic keys or set of keys that may be activated to provide a full set of alphanumeric keys. In addition to providing input, the user input interface can be used, for example, to activate and/or deactivate certain functions, such as screen savers and/or sleep modes. Although not shown, the carrier device 105 may also include a battery, such as a vibrating battery pack, for powering the various circuits that are required to operate the carrier device 105, as well as optionally providing mechanical vibration as a detectable output. The carrier device 105 may further include a printing device that may be utilized for printing various items, such as shipping labels and/or receipts.

The carrier device 105 can also include volatile memory 422 and/or non-volatile memory 424, which can be embedded or may be removable. For example, the non-volatile memory may be embedded or removable MMCs, SD memory cards, Memory Sticks, EEPROM, flash memory, hard disk, and/or the like. The memory can store any of a number of pieces or amount of information and data used by the carrier device 105 to implement the functions of the carrier device 105. The memories may store one or more applications (e.g., software programs), instructions, pieces of information, data, and/or the like which may be used by the carrier device 105 for performing functions of the carrier device 105. For instance, as described in greater detail below, one or more of the memories on the carrier device 105 may store an authentication application 440 in various embodiments that performs various aspects of the claimed invention. The carrier device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites.

d. Exemplary Customer Computing Device

The customer computing devices 102 may each include one or more components that are functionally similar to those of the carrier server 104. For example, in one embodiment, each of the customer computing devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein.

e. Exemplary Carrier Social Network Server

Various embodiments may include a carrier social network server that provides a carrier and/or business social network. The components of the carrier social network server may include one or more components that are functionally similar to those of the carrier server 104. For example, in one embodiment, each of the customer computing devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein.

III. Exemplary System Operation

With the increasing sophistication of mobile devices, users can now access the Internet from almost anywhere. This allows business owners to conduct business in non-traditional locations such as coffee shops, restaurants, airports, etc. Additionally, users can also use mobile devices to access social networks. Various embodiments of the present invention harnesses the power of these sophisticated mobile devices and social networks to provide new delivery options for consignees for whom current delivery options may not be sufficient. For example, various embodiments may allow users to identify one or more alternative delivery locations. Moreover, the system may proactively suggest one or more alternative delivery location(s) to facilitate more efficient delivery. In addition, the system may determine the consignee has physical moved to another location (address, city, state, country) and has requested "follow-me" service that would automatically forward the package to the next available mobile delivery location.

1. Registration

Figure 5:
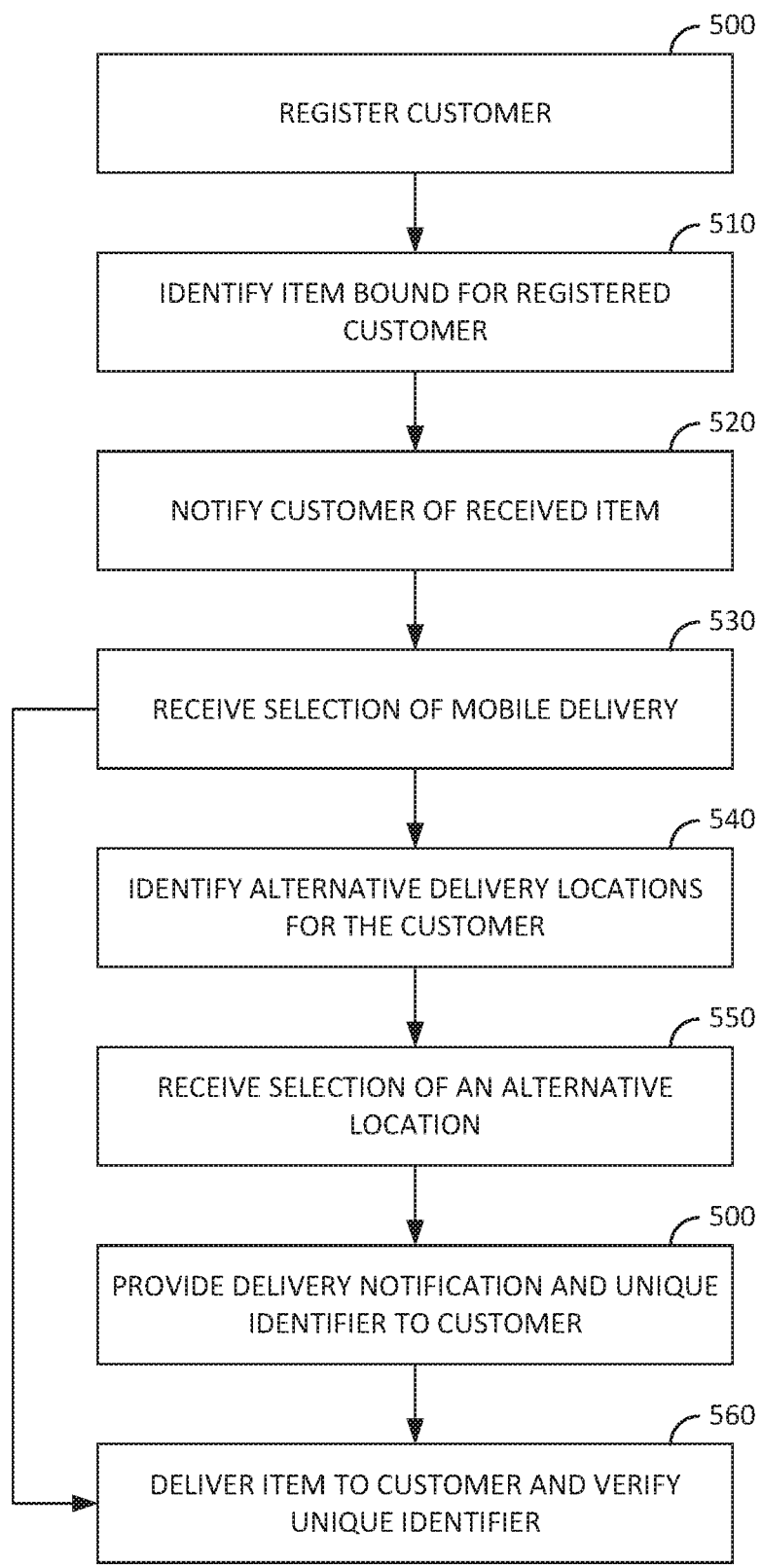
FIG. 5 is a flowchart illustrating operations and processes that can be used in accordance with embodiments of the present invention.

In various embodiments, the process may begin at Block 500, in FIG. 5, with the enrollment/registration of one or more customers for a customer delivery program. Co-pending U.S. patent application Ser. No. 13/174,299, filed Jun. 30, 2011 and entitled "Customer Controlled Management of Shipments," which is incorporated by reference herein in its entirety, describes a registration process and operations of various customer delivery programs that may operate in conjunction with embodiments of the present invention. A customer may be an individual, a family, a company, an organization, an entity, a department within an organization, a representative of an organization and/or person, and/or the like. To register, a customer (e.g., a customer or customer representative operating a customer mobile device 101 or computing device 102) may access a webpage or portal of a carrier, such as United Parcel Service of America, Inc. (UPS). For instance, the one or more carrier servers 104 may transmit a webpage that provides the customer with an option of logging into a customer account or enrolling/registering for a social customer delivery program via public social networks, business social networks and/or a private social network provided by the carrier.

In one embodiment, as part of the enrollment/registration process, the customer (e.g., a customer or customer representative operating a customer mobile device 101 or computing device 102) may be requested to provide biographic and/or geographic information by the one or more carrier servers 104. For instance, the customer may provide the customer's name, such as a first name, a last name, a company name, an entity name, and/or an organization name. The customer may also provide any aliases associated with the customer. For instance, if the customer were an individual named Joseph Brown, the customer may provide Joe Brown or Joey Brown as aliases. The customer may also provide one or more addresses associated with the customer (e.g., street address, city, state, postal code, and/or country). For instance, Joseph Brown's address may be 105 Main Street, Atlanta, Ga. 30309, USA. As indicated, the customer may have multiple addresses associated with the account. For instance, Joseph Brown may have a home address and a business address associated with his account. Similarly, an organization may have multiple locations (e.g., addresses) associated with its account. When multiple addresses are provided, the customer may indicate which address should be used as the primary address. As will be recognized, the customer may provide other biographic and/or geographic information to adapt to various needs and circumstances.

In one embodiment, once the one or more carrier servers 104 receives the necessary biographic and/or geographic information from the customer or customer's external social network, the one or more carrier servers 104 may perform one or more validation operations. For example, the one or more carrier servers 104 may determine whether the primary address (and/or other addresses) in the specified country or postal code is eligible for a customer delivery program, such as for example a Mobile Delivery program as discussed in more detail below. The one or more carrier servers 104 may also determine whether the primary address (and/or other addresses) is valid, e.g., by passing the primary address through one or more address cleansing or standardization systems. The one or more carrier servers 104 may perform a variety of fraud prevention measures as well, such as determining whether the customer or one of the customer's addresses has been "blacklisted" from customer delivery programs. As will be recognized, a variety of other approaches and techniques can be used to adapt to various needs and circumstances.

In one embodiment, the one or more carrier servers 104 may create a customer profile for the customer via the enrollment/registration process. Accordingly, the one or more carrier servers 104 may create and store various customer profiles (e.g., via database 90 and/or carrier (private) internal social network). In addition to at least the information described above, a customer profile may include one or more corresponding usernames and passwords. Additionally, the one or more carrier servers 104 may also create and store a customer identifier (e.g., personal ID) in association with the customer profile. In one embodiment, a customer identifier may be used to uniquely identify a customer profile. In another embodiment, a customer identifier may be used to uniquely identify a given address associated with a customer profile and/or carrier (private) internal social network. In such an embodiment, if a customer profile is associated with four addresses, the one or more carrier servers 104 may create and store four customer identifiers in association with the customer profile. The customer identifier may also be stored in association with shipping data for an item to associate the item (and its shipping data) with the (a) correct customer (e.g., customer profile) and/or (b) correct address for a customer. In various embodiments, a customer identifier may be used in place of an address on an item as will be discussed in greater detail below.

In one embodiment, a customer profile within a carrier social network may correspond to one or more customer delivery programs. For instance, a customer (e.g., a customer or customer representative operating a customer mobile device 101 or computing device 102) may subscribe to one or more specific customer delivery programs. For example, the various customer delivery programs may allow customers to have access to certain features, e.g., delivery alerts, approximate delivery times, change delivery options, electronically authorize the release of an item, and/or route items to will call. Other customer delivery programs may include allowing customers to route items to other retail locations, reschedule deliveries, request that items be delivered to another address, and/or provide instructions for delivery. As will be recognized, these features are provided for illustrative purposes and are not limiting to embodiments of the present invention. Moreover, a variety of other approaches and techniques can be used to adapt to various needs and circumstances.

In one embodiment, once a customer profile has been created by the one or more carrier servers 104, the customer (e.g., a customer or customer representative operating a customer mobile device 101 or computing device 102) can provide various preferences associated with the customer delivery program to the one or more carrier servers 104 via a webpage, for example. For instance, the customer (e.g., a customer or customer representative operating a customer mobile device 101 or computing device 102) can provide a variety of preferences, such as communication preferences, delivery preferences, delivery options, and/or delivery instructions.

In various embodiments, one of the specific customer delivery programs offered is a "Mobile Delivery" program. When a user selects the Mobile Delivery program, the one or more carrier servers 104 may then allow the customer to register one or more mobile devices 101 such that the carrier server can access the GPS location of the mobile device(s). As will be described in more detail below, the location information derived from the mobile device 101 may be used to identify possible delivery locations.

The one or more carrier servers 104 may also provide a list of social network options from which the user may select. These options may include public Open Social Networks (e.g., Facebook, FourSquare, etc.), private carrier service Customer Social Networks (a private social network maintained by the carrier for users of the Delivery Service), a private Carrier Service Social Networks (a private social network maintained and constructed by the carrier via the carrier's internal operations' data to identify the members of a social network for consolidated deliveries), a user's Business Social Networks (e.g., Yammer, Socialcast, etc.) and/or a vehicle social network. Other social network options may be included as well. As will be discussed in greater detail below, information retrieved from these social networks may provide location information regarding the customer and thus be used to identify possible delivery locations.

In various embodiments, a vehicle social network may communicate with vehicle devices (e.g., navigation devices, OnStar®, cellular terminals, etc.) associated with members of the vehicle social network. For example, the vehicle devices may communicate "checkin" and "checkout" events based on vehicle conditions and/or location information (e.g., GPS locations, proximate a retail location such as a shopping mall) to the vehicle social network. For example, a vehicle device may send a check-in message indicating a location of the vehicle to a vehicle social network when the vehicle has been turned off for a predetermined threshold time (e.g., 3 minutes, 1 hour) and a checkout message when the vehicle moves beyond a predetermined distance threshold from the checkin location. These locations may be used to facilitate item deliveries to or pickups from the vehicle.

In some embodiments, the one or more carrier servers 104 may determine whether the location(s) associated with the customer are available for the Mobile Delivery program. For example, some carriers may restrict the Mobile Delivery program to certain delivery areas or delivery types (e.g., restricted to particular cities, states, or domestic deliveries, etc.) This may be accomplished by the carrier using methods that consider physical locations of packages, service providers (delivery personnel), service vehicles, with customer reported and/or checked in social locations and/or customer vehicle reported and/or checked in locations via a social network.

2. Identifying Mobile Delivery Shipments

Following registration of a customer and creation of a customer profile, the process may continue to Block 510 of FIG. 5 where one or more items to be delivered to the customer by the carrier may be identified. By identifying items to be delivered to the customer, the one or more carrier servers 104 can provide the customer with access to various features of a customer delivery program for the item. As will be recognized, an item may be a parcel or group of parcels, a package or group of packages, scrap metal banded together, a vehicle part, a box, a crate, a drum, a box strapped to a pallet, and/or the like. In one embodiment, each item may include an item/shipment identifier, such as a barcode, a MaxiCode, electronic representation, and/or text. The item/shipment identifier (e.g., 123456789) may be used by the carrier to identify and track the item as it moves through the carrier's transportation network. Such item/shipment identifiers can be affixed to items by, for example, using a sticker (e.g., label) with the item/shipment identifier printed thereon (in human and/or machine readable form), an RFID tag with the item/shipment identifier stored therein or an electronic tag with a display screen.

In one embodiment, the one or more carrier servers 104 may store an item/shipment identifier in association with shipping data for the item. The shipping data may include information about the item, such as delivery service level. For example, the delivery service level may be Next Day Air, Next Day Air Early AM, Next Day Air Saver, 2nd Day Air, 2nd Day Air Early AM, 3 Day Select, and/or Ground. The shipping data may include information about the party shipping the item (e.g., consignor), such as the party's address, the party's phone number, the party's return address, the party's name, and/or the like. The shipping data may also include information about the customer to whom the item is to be delivered (e.g., consignee), such as the customer's address (e.g., delivery location), the customer's phone number, the customer's name, and/or the like. In various embodiments, the shipping data may include a customer identifier in place of an address.

In one embodiment, the shipping data may include information about the item itself and any tracking information. The tracking information may reflect the item's movement in the carrier's transportation network, including expected delivery date and time. To reflect the item's movement, an item/shipment identifier associated with the item may be scanned or otherwise electronically read at various points as the item is transported through the carrier's transportation network. For example, the item/shipment identifier may be automatically scanned by a barcode or MaxiCode device, an RFID interrogator, by a camera controller, or by a carrier employee using a handheld device (e.g., carrier device 105). In one embodiment, each time the item/shipment identifier is scanned or read, an appropriate device can transmit the item/shipment identifier and other appropriate information (e.g., location and time of the scan or reading) to the one or more carrier servers 104. The one or more carrier servers 104 can then receive and use the information to track the item as it is transported though the carrier's transportation network and update the shipping data accordingly.

In one embodiment, the one or more carrier servers 104 can use the shipping data to identify one or more customer profiles corresponding to the item. As described, each customer profile may include one or more addresses associated with the customer. Thus, when the one or more carrier servers 104 receives shipping data (or a portion of shipping data) for an item, the one or more carrier servers 104 can determine whether the item corresponds to any customers enrolled/registered for a customer delivery program, such as the Mobile Delivery program.

After identifying the appropriate customer profile, the one or more carrier servers 104 can associate the shipping data with the customer profile. This may include appending the shipping data with the appropriate customer identifier (or other identifier corresponding to the customer profile). For instance, the shipping data for all shipments corresponding to Joseph Brown's customer profile may be appended with the customer identifier (or other identifier) created for Joseph Brown. In various embodiments, using this approach allows items (and their shipping data) to be linked to appropriate customer profiles. In some embodiments, the customer identifier may already be present in the shipping data. Based on the associated customer profile, the one or more carrier servers 104 can ascertain whether the customer has elected the Mobile Delivery program.

3. Mobile Delivery

In various embodiments, when a Mobile Delivery shipment is identified, the associated customer may be notified that an item is en-route at Block 520 of FIG. 5. The notification may be provided in one or more formats including text messages (e.g., Short Message Service (SMS) and/or Multimedia Messaging Service (MMS), email messages, voice messages, and/or a variety of other messages in various communication formats.

In response to the notification, the customer (e.g., a customer or customer representative operating a customer mobile device 101 or computing device 102) may access a webpage or portal of a carrier and provide instructions on the type of delivery desired at Block 530. The customer may request immediate delivery to the original address thereby bypassing the Mobile Delivery. Alternatively, the customer may choose to have the item delivered via the Mobile Delivery service and/or to specific mobile locations and may also specify a delivery time. In some embodiments, the customer's item will automatically be delivered via the Mobile Delivery service unless the user requests otherwise on an item-by-item basis. In other embodiments, the user may need to log onto the carrier webpage or portal to request that an item be delivered via the Mobile Delivery service. In still other embodiments, the customer may choose the Mobile Delivery program as part of completing a transaction with an online merchant, in which case the shipment may be delivered automatically via the Mobile Delivery service by the carrier. In a still further embodiment, the item may be initially delivered to the original destination address. If the customer is not present at that location, the Mobile Delivery service may be automatically initiated (based on previous authorization from the customer).

Assuming the Mobile Delivery service is selected for the particular item(s) (e.g., by the customer or automatically), the one or more carrier servers 104 may identify possible alternative delivery location(s) at Block 540 for selection by the customer at Block 550. These alternative delivery location(s) may be determined based on the GPS location of the customer's mobile device 101 which may be accessed after the customer requested Mobile Delivery. The alternative delivery location(s) may also be determined by accessing the customer's social networks as previously authorized. Using this information, the one or more carrier servers 104 may identify potential delivery locations such as restaurants, retail stores, landmarks or other locations that are within a predetermine distance from the determined location of the customer.

In some embodiments, the one or more carrier servers 104 may use the location information to "pro-actively" identify potential delivery locations such as restaurants, retail stores, landmarks or other locations that are within a predetermine distance of the determined location of the customer and "pro-actively" notify the customer of this option (e.g., before the customer has selected the Mobile Delivery option). For example, the alternate delivery location(s) may be communicated to the customer with the notification or when the customer accesses the web portal. As discussed in greater detail with respect to FIG. 6 below, the one or more carrier servers may also use various algorithms to predict the location of a customer and offer these locations as possible alternative delivery locations.

In addition, using the location information, the one or more carrier servers 104 may identify potential delivery locations such as restaurants, retail stores, landmarks or other locations that are not within a predetermine distance from the "original" determined location of the customer, but now "follows the customer" to his/her next location. This location may be another city, state and/or country if said service has been authorized by the customer as a mobile delivery option. The carrier service provider may use navigation tools to find the delivery location, social network information including information about the customer and/or the customer's vehicle (which may be part of a vehicle social network). In various embodiments, the alternate delivery location may be provided directly from the customer as opposed to selecting a location proposed by the one or more carrier servers 104.

In further embodiments, the alternative delivery location may be a dynamic location based on the mobile device 101 GPS or social network account. For this embodiment, the customer may provide a base location (e.g., original address, current GPS location, retail store, landmark, intersection) and agree to remain within a predetermined distance from that location (e.g., 1 mile). For example, the customer may be shopping at nearby retail stores and request that the item is delivered to her dynamic location. The carrier service provider would then use the GPS location of the customer's mobile device 101, social network information including information about the customer and/or the customer's vehicle (which may be part of a vehicle social network) to locate the customer and make the delivery of the item. In various embodiments, the carrier service provider may initially be en-route to the original address and receive a message from the one or more carrier servers 104 to re-route the item to a dynamic delivery location. The carrier service provider could then use navigation techniques, social network information including information about the customer and/or the customer's vehicle (which may be part of a vehicle social network) to locate the dynamic location of the customer. In some embodiments, the item may be delivered to a different delivery vehicle determined by the carrier that is already schedule to deliver near the dynamic location.

In various embodiments, once the alternative delivery location is selected by the customer (e.g., via the web portal or return message) at Block 550, the carrier will schedule the final delivery of the items via the Mobile Delivery service. The one or more carrier servers 104 may send a notification to the customer indicating the delivery date and time window at Block 560. In various embodiments, the notification may also include a unique human or machine-readable code. The unique human or machine-readable code may be an alphanumeric code, an image, a 1D or 2D barcode, a QR Code, a Maxicode, or the like. When the carrier service provider delivers the item, the carrier service provider may use the human or machine-readable code to confirm the user's identity at Block 570 (via authentication application 440). For example, the customer may retrieve the notification and associated code on a mobile device 101 and the carrier service provider may scan the code with the carrier device 105 or visually inspect the code to confirm the customer's identity. In other embodiments, near field communication protocols may be used to transfer identification information between the user's mobile device 101 and the carrier device 105. In further embodiments, the customer may be given or may select a personal identification number (PIN) which could be used to confirm the customer's identity. In still further embodiments, the customer may communicate a digital image (e.g., portrait of the customer) to the carrier and the carrier service provider may access the digital image using the carrier device 105 to confirm the customer's identity.

In some embodiments, a customer may also schedule an item pickup through the Mobile Delivery Service, via a similar process. In this case, the customer may access a web portal or webpage generated by the one or more carrier servers 104 and request an item pick-up under the Mobile Delivery program. Similar to the scheduling of item deliveries, the one or more carrier servers 104 may determine the location of the customer as generally described above and propose a pickup location. Similar types of notifications may also be sent regarding pick-ups as are discussed herein with respect to item deliveries. The item deliveries and pick-ups may then be completed by the Mobile Delivery service.

4. Predicting the Future Location of a Customer

In various embodiments, the one or more carrier servers 104 may access various sources of data for use in predicting the location of the customer for use in suggesting a delivery location. One source of the data may be a calendar initiated during registration and maintained by the one or more carrier servers. With this calendar, the customer may indicate normal locations for the customers during certain time periods (e.g., working hours, days, weeks, months, years). Another source of data may be from social networking sites. As noted above, the customer may indicate the carrier as a friend or provide some other type of link with one or more social networks. In this way, the one or more carrier servers can periodically retrieve location information for the customer and/or review the customer's location history over a predetermined period of time. A further source of the data may be the customer's personal electronic calendar (e.g., Outlook, iPhone calendar, etc.) Other sources of data may include mobile device GPS locations and RFID tracking devices. In various embodiments, this data may be accessed when an item is bound for a Mobile Delivery customer. In some embodiments, the data may be accessed and stored (e.g., via database 90) periodically for prediction purposes.

Once an item has been identified as being bound for a Mobile Delivery customer as described above, the one or more carrier servers compares a projected delivery date as initially calculated by the carrier to the customer's electronic calendar (e.g., personal or maintained by carrier) and/or social network locations. One or more probable locations are identified based at least in part on this comparison. If more than one probable location is identified, the locations may be ranked based on the calculated probability.

Figure 6:
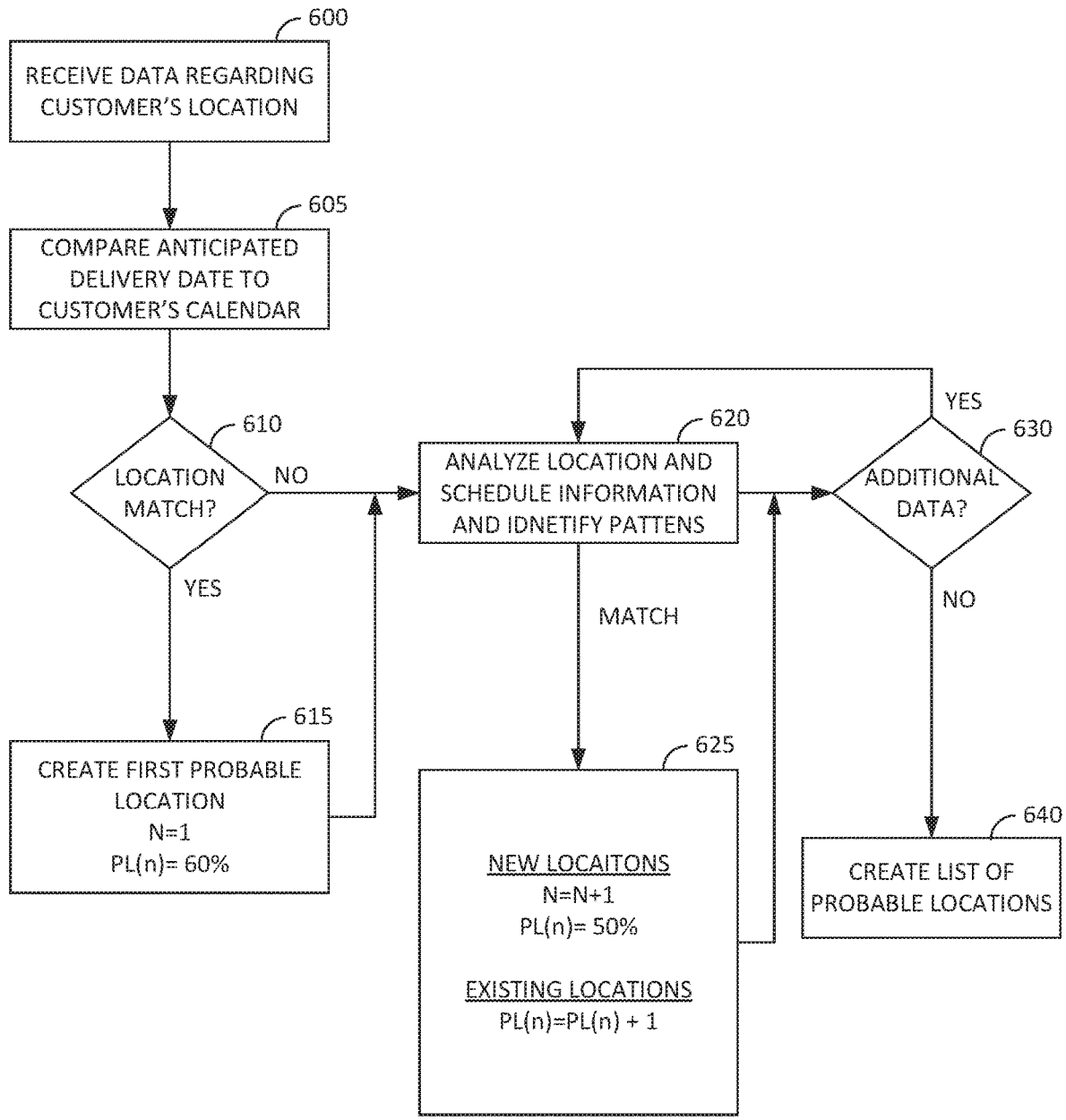
FIG. 6 is a flowchart illustrating operations and processes that may be performed to determine a probable delivery location in accordance with various embodiment of the present invention.

FIG. 6 is flowchart illustrating an algorithm that may be used to predict the location of a customer for use in providing a proposed delivery location to a customer. The process beings at Block 600 with the one or more carrier servers 104 receiving data related to the customer's location. Sources of this data may include an electronic calendar hosted by the carrier, a customer's personal calendar (e.g., outlook calendar), social media location information (e.g., FaceBook, LinkedIn, Twitter, MySpace, Google+, deviantART, LiveJournal, Tagged, Piinerest, Orkut, Pinterest, LINE (Japan), WeChat (China), etc.), geolocators (e.g., smart phones, car navigation devices, computer devices or internet connected devices with geolocation code information), and/or RFID tracing devices. In various embodiments, the one or more carrier servers 104 may periodically gather and store this data for use in further calculations. In other embodiments, the one or more carrier servers may access the data from the various sources as needed. Some embodiments may use a combination of real-time data and previously gathered/stored data.

The gathered data is compared against the anticipated delivery date (and possibly the time window) at Block 605. If there is a match at Block 610, the one or more carriers 104 assigns a probability value to the location. For example, the calendar may indicate the user will be working from an alternate office when the delivery is anticipated. The exemplary algorithm assigns a 60% probability to the match to the alternate office location. It should be understood that this is exemplary only and that other probability values may be assigned to matches as desired. Once the value is assigned, the process proceeds to Block 620 where further location data is analyzed.

In the event no match is found at Block 610, the process proceeds to Block 620 where other sources of location data are analyzed. For example, the one or more carrier servers 104 may review social media location information, geolocator information and/or RFID tracing devices to determine where the customer is typically located in relation to the anticipated delivery date and time window. For example, the one or more carrier servers 104 may analyze a certain time frame of data (e.g., a week, a month, a quarter, a year, etc.) to ascertain where the customer typically resides on certain days of the week (e.g., works at certain locations on certain days) or other patterns (e.g., customer frequents certain stores, restaurants, pharmacies, etc.). The one or more carrier servers 104 may then establish a threshold number of occurrences within a certain time frame to identify a location "match." Multiple occurrences may be identified as a match if each location is within a certain threshold distance.

If one or more "matches" are found using the location data, the process continues to Block 625 where probability values are assigned to the one or more matches. If the "match" location was already assigned a probability value from the calendar analysis, the probability may be increased due to this additional match. If the match location is new, a separate value is assigned. In various embodiments, the probability value may be at least partially dependent on the number of matches within the historical data are found for the particular location.

At Block 630, the one or more carrier servers 104 determines if additional data should be retrieve for the location analysis. In some embodiments, the determination may be made based on the age of the historical data. For example, if the historical data was last updated over a particular time threshold (e.g., 3 months, 6 months, 1 year), the one or more carrier servers 104 may retrieve additional data. If the data is sufficiently current and/or complete, the process may proceed to Block 640.

At Block 640, a list of probable locations is generated. The list may include the locations identified in the calendar analysis and/or the location analysis. In various embodiments, the locations on the list are ranked based on the calculated probability.

After determining probable locations, the one or more carrier servers 104 may send a message to the associated customer that an item is en-route. The notification may be provided in one or more formats including text messages (e.g., Short Message Service (SMS) and/or Multimedia Messaging Service (MMS), email messages, voice messages, and/or a variety of other messages in various communication formats. In various embodiments the customer may be contacted with using social media methods of communication (i.e. FaceBook messages, tweets, etc.) pursuant to a customer's preference.

The message may include a list of the probable locations for selection by the customer. In various embodiments, the customer may need to access a carrier webpage or portal to select the desired location from the list of locations. A hyperlink may be provided in the message to the appropriate webpage to make the selection. In some embodiments, the customer may be permitted to provide a new delivery location as generally described above. After selection of the location, the item is delivered to the confirmed location. The location may be fixed or dynamic as noted above.

Various embodiments may also predict and change the communication method based on the customer's activity on the different social media channels. For example, a customer may prefer to communicate via FaceBook messages but when traveling to China, FaceBook is blocked in that country so the customer may switch to text messages. The customer's preferences as well as past activities may allow the algorithm to predict this switching pattern based on scheduled travel and locations.

5. Delivery to an Unattended Vehicle

In various embodiments, the carrier may deliver/pick-up a shipment to an unattended vehicle as opposed to an address or to a specific person. To facilitate this type of delivery/pick-up, the customer may notify the carrier as to the location of the vehicle or give the carrier permission to automatically find the customer's vehicle. This may be accomplished by sending the GPS location of the vehicle using the customer's mobile device 101, a vehicle navigation system or third party car monitoring service, such as OnStar®. With this information, the one or more carrier servers 104 may route (or reroute) the customer's item to the received vehicle location for delivery or send dispatch carrier personnel to complete an item pick-up from an unattended vehicle.

When the carrier service provider arrives at the vehicle, the carrier service provider may use the carrier device 105 to contact an associated third party car monitoring service to send a signal to the vehicle to open the trunk or unlock the vehicle. Alternatively, the customer may provide the one or more carrier servers 104 with the appropriate codes to open the trunk of the vehicle. In this instance, the carrier service provider enters the code into a keypad associated with the vehicle or uses the carrier device 105 to send the appropriate signal to the vehicle to open the truck. The signal sent by the carrier device 105 would mimic the customer's key fob. After delivering the shipment, the carrier service provider would lock the trunk and/or vehicle.

6. Delivery to an Unattended Home

In various embodiments, the carrier may deliver/pick-up a shipment to an unattended home. To facilitate this type of delivery/pick-up, the customer may notify the carrier as to give the carrier permission to enter an area of the home. This may be accomplished by sending the GPS location of the home location using the customer's mobile device 101, accessing a social network (public or private), a home security system and/or third party security monitoring service, such as ADT®. With this information, the one or more carrier servers 104 may route (or reroute) the customer's item to the received location for delivery or send dispatch carrier personnel to complete an item delivery/pick-up from an unattended home.

When the carrier service provider arrives at the home, the carrier service provider may use the carrier device 105 to contact an associated third party home monitoring service to send a signal to the home to open an area and/or unlock an area of the home (i.e. garage door). Alternatively, the customer may provide the one or more carrier servers 104 with the appropriate codes to open the home. In this instance, the carrier service provider enters the code into a keypad associated with the home or uses the carrier device 105 to send the appropriate signal to the home to open the home and/or designated area. The signal sent by the carrier device 105 would mimic the customer's key fob. After delivering the shipment, the carrier service provider would lock the home and/or area.

ZigBee networks are used for home and office automation. Typically these types of networks are used to control smart devices (door locks, lights, energy control systems, etc.). With a customer's permission, the carrier could use these devices to deliver packages into secure areas.

What is claimed is:

1. Non-transitory computer-readable media having computer-executable instructions embodied thereon that, when executed by one or more processors, facilitate a method for secured delivery of an item, the method comprising:
   creating a customer profile, via a computer system, that maintains an association of a customer with at least one of a customer mobile computing device or a social network;
   receiving real-time location information relating to a geographic location from the at least one of the customer mobile computing device or the social network;
   capturing shipping indicia from the item and associating the item with the customer profile based at least in part on the shipping indicia;
   determining one or more alternative dynamic delivery locations based on the real-time location information;
   allowing the customer to select one of the one or more alternative dynamic delivery locations for the delivery of the item; and
   responsive to receiving a selection of the one of the one or more alternative dynamic delivery locations;
   providing a first digital image comprising a first unique identifier for display via an interactive interface of the customer mobile computing device;
   receiving an indication from the customer mobile computing device indicating that the customer mobile computing device will remain within a predetermined distance from the alternative dynamic delivery location selected by the customer;
   determining the physical location of the customer based on a GPS location of the customer mobile computing device or the social network, within the predetermined distance of the alternative dynamic delivery location selected by the customer;
   receiving, via a portable carrier computing device, a displayed unique identifier that is captured from the interactive interface of the customer mobile computing device;
   determining whether the first unique identifier and the displayed unique identifier are the same; and
   responsive to determining that the first unique identifier and the displayed unique identifier are the same, providing, for display via an interface executing on the portable carrier computing device, a notification to release the item.

2. The non-transitory computer-readable media of claim 1, wherein the method further comprises:
   sending a notification of receipt of the item wherein the notification of the receipt includes indicia identifying the one or more alternative dynamic delivery locations for selection by the customer.

3. The non-transitory computer-readable media of claim 1, wherein the method further comprises:
   sending a notification of receipt of the item wherein the notification of the receipt includes a hyperlink to a carrier webpage; and
   providing the carrier webpage that comprises indicia identifying the one or more alternative dynamic delivery locations.

4. The non-transitory computer-readable media of claim 1, wherein the method further comprises:
   analyzing user data to identify location patterns; and
   determining the one or more alternative dynamic delivery locations based at least in part on the identified location patterns.

5. The non-transitory computer-readable media of claim 1, wherein the one or more alternative dynamic delivery locations are within a threshold distance of the real-time location information received from the customer mobile computing device.

6. The non-transitory computer-readable media of claim 1, wherein the one or more alternative dynamic delivery locations are within a threshold distance of a check-in location received from the social network.

7. The non-transitory computer-readable media of claim 1, wherein the one or more alternative dynamic delivery locations are within a threshold distance of a destination address derived from the shipping indicia.

8. The non-transitory computer-readable media of claim 1, wherein the first digital image comprises an alphanumeric code.

9. The non-transitory computer-readable media of claim 1, wherein the method further comprises:
   sending a delivery notification wherein the delivery notification includes the first unique identifier; and
   scanning the first unique identifier to confirm an identity of a user when delivering the item to the user.

10. The non-transitory computer-readable media of claim 1, wherein the method further comprises:
    predicting a location of a user based at least in part on the received location information, wherein the determining one or more alternative dynamic delivery locations is also based at least in part on the predicted location of the user.

11. A method for delivering an item comprising:
    creating a customer profile, by a computer system, that maintains an association of a customer with at least one of a customer mobile computing device or a social network;
    receiving real-time location information relating to a geographic location from the at least one of the customer mobile computing device or the social network;
    capturing shipping indicia from the item and associating the item with the customer profile based at least in part on the shipping indicia;
    determining one or more alternative dynamic delivery locations based on the real-time location information;
    allowing the customer to select one of the one or more alternative dynamic delivery locations for delivery of the item; and
    responsive to receiving a selection of the one of the one or more alternative dynamic delivery locations;
    providing a first digital image comprising a first unique identifier for display via an interactive interface of the customer mobile computing device;
    receiving an indication from the customer mobile computing device indicating that the customer mobile computing device will remain within a predetermined distance from the alternative dynamic delivery location selected by the customer;
    determining the physical location of the customer based on a GPS location of the customer mobile computing device or the social network, within the predetermined distance of the alternative dynamic delivery location selected by the customer;

receiving, by a portable carrier computing device, a displayed unique identifier that is captured from the interactive interface of the customer mobile computing device;

determining whether the first unique identifier and the displayed unique identifier are the same; and responsive to determining that the first unique identifier and the displayed unique identifier are the same, providing, for display via an interface executing on the portable carrier computing device, a notification to release the item.

12. The method of claim 11, further comprising:
sending a notification of receipt of the item wherein the notification of the receipt includes indicia identifying the one or more alternative dynamic delivery locations for selection by the customer.

13. The method of claim 11, further comprising:
sending a notification of receipt of the item wherein the notification of the receipt includes a hyperlink to a carrier webpage; and
providing the carrier webpage that comprises indicia identifying the one or more alternative dynamic delivery locations.

14. The method of claim 11, further comprising:
analyzing user data to identify location patterns; and
determining the one or more alternative dynamic delivery locations based at least in part on the identified location patterns.

15. The method of claim 11, wherein the one or more alternative dynamic delivery locations are within a threshold distance of the real-time location information received from the customer mobile computing device.

16. A computer system comprising:
at least one processor; and
computer readable media communicatively coupled to the at least one processor, the computer readable media comprising computer executable instructions that when executed by the at least one processor cause the at least one processor to perform a method for facilitating secured delivery of an item, the method comprising:
creating a customer profile, via the computer system, that maintains an association of a customer with at least one of a customer mobile computing device or a social network;
receiving real-time location information relating to a geographic location from the at least one of the customer mobile computing device or the social network;
capturing shipping indicia from the item and associating the item with the customer profile based at least in part on the shipping indicia;

determining one or more alternative dynamic delivery locations based on the real-time location information;
allowing the customer to select one of the one or more alternative dynamic delivery locations for the delivery of the item; and
responsive to receiving a selection of the one of the one or more alternative dynamic delivery locations;
providing a first digital image comprising a first unique identifier for display via an interactive interface of the customer mobile computing device;
receiving an indication from the customer mobile computing device indicating that the customer mobile computing device will remain within a predetermined distance from the alternative dynamic delivery location selected by the customer;
determining the physical location of the customer based on a GPS location of the customer mobile computing device or the social network, within the predetermined distance of the alternative dynamic delivery location selected by the customer;
receiving, via a portable carrier computing device, a displayed unique identifier that is captured from the interactive interface of the customer mobile computing device;
determining whether the first unique identifier and the displayed unique identifier are the same; and
responsive to determining that the first unique identifier and the displayed unique identifier are the same, providing, for display via an interface executing on the portable carrier computing device, a notification to release the item.

17. The computer system of claim 16, wherein the one or more alternative dynamic delivery locations are within a threshold distance of a destination address derived from the shipping indicia.

18. The computer system of claim 16, wherein the first digital image comprises an alphanumeric code.

19. The computer system of claim 16, wherein the method further comprises:
sending a delivery notification wherein the delivery notification includes the first unique identifier; and
scanning the first unique identifier to confirm an identity of a user when delivering the item to the user.

20. The computer system of claim 16, wherein the method further comprises:
predicting a location of a user based at least in part on the received location information, wherein the determining one or more alternative dynamic delivery locations is also based at least in part on the predicted location of the user.

* * * * *